United States Patent
Noguchi

(10) Patent No.: US 10,116,636 B2
(45) Date of Patent: Oct. 30, 2018

(54) APPARATUS AND METHOD FOR SECURE TRANSMISSION AVOIDING DUPLICATE DATA

(71) Applicant: FUJITSU LIMITED, Kawasaki-shi, Kanagawa (JP)

(72) Inventor: Yasuo Noguchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/695,324

(22) Filed: Apr. 24, 2015

(65) Prior Publication Data
US 2015/0358302 A1 Dec. 10, 2015

(30) Foreign Application Priority Data

Jun. 4, 2014 (JP) .................................. 2014-116257

(51) Int. Cl.
*H04L 29/06* (2006.01)
*H04L 29/08* (2006.01)
*G06F 21/60* (2013.01)

(52) U.S. Cl.
CPC .......... *H04L 63/061* (2013.01); *G06F 21/606* (2013.01); *H04L 63/0428* (2013.01); *H04L 63/12* (2013.01); *H04L 67/2842* (2013.01)

(58) Field of Classification Search
CPC .................................................... H04L 63/061
See application file for complete search history.

(56) References Cited

U.S. PATENT DOCUMENTS 6,667,700 B1 * 12/2003 McCanne ............... H03M 7/30
                                                         341/50
7,003,667 B1 * 2/2006 Slick ..................... G06F 21/608
                                                     380/243

(Continued)

FOREIGN PATENT DOCUMENTS

| JP | 2000-244475 | 9/2000 |
| JP | 2001-290691 | 10/2001 |

(Continued)

OTHER PUBLICATIONS

Puzio et. al., ClouDedup: Secure Deduplication with Encrypted Data for Cloud Storage, 2013.*

(Continued)

*Primary Examiner* — Mahfuzur Rahman
*Assistant Examiner* — Richard W Cruz-Franqui
(74) *Attorney, Agent, or Firm* — Staas & Halsey LLP

(57) ABSTRACT

A first communication device determines whether an encryption key is stored in a first memory in association with an identifier of data requested to transmit, and transmits the identifier of data requested to transmit and the encryption key associated therewith to a second communication device, when it is determined that the encryption key is stored in the first memory in association with the identifier of data requested to transmit. The second communication device determines whether encrypted data is stored in a second memory in association with the identifier contained in data received from the first communication device, decodes, when it is determined that the encrypted data is stored in the second memory in association with the identifier contained in the received data, the encrypted data with the encryption key contained in the received data, and outputs the decoded data.

8 Claims, 25 Drawing Sheets

(56) References Cited

U.S. PATENT DOCUMENTS

| | | | |
|---|---|---|---|
| 8,504,844 B2* | 8/2013 | Browning | G06F 17/30286 713/189 |
| 9,225,691 B1* | 12/2015 | Balasubramanian | G06F 21/00 |
| 2010/0070764 A1* | 3/2010 | Ishii | G06F 11/1453 713/168 |
| 2011/0283113 A1* | 11/2011 | Moffat | G06F 21/602 713/189 |
| 2011/0317839 A1* | 12/2011 | Yoneda | H04L 9/085 380/270 |
| 2012/0173558 A1* | 7/2012 | Sorenson, III | G06F 17/30303 707/758 |
| 2012/0173656 A1* | 7/2012 | Sorenson, III | G06F 17/30156 709/217 |
| 2014/0040616 A1* | 2/2014 | Barber | G06F 11/1453 713/168 |
| 2014/0189373 A1* | 7/2014 | Gonzalvo | G06F 9/5061 713/193 |
| 2014/0250491 A1* | 9/2014 | Fleischman | H04L 63/20 726/1 |
| 2015/0304113 A1* | 10/2015 | Nix | H04W 4/70 713/176 |
| 2015/0324371 A1* | 11/2015 | Guo | G06F 3/06 707/693 |
| 2015/0358302 A1* | 12/2015 | Noguchi | H04L 63/0428 713/171 |
| 2016/0065369 A1* | 3/2016 | Kakutani | H04L 9/0897 380/286 |
| 2016/0105407 A1* | 4/2016 | Ohbitsu | H04L 63/0457 713/171 |
| 2016/0306699 A1* | 10/2016 | Resch | H04L 67/1097 |

FOREIGN PATENT DOCUMENTS

| | | |
|---|---|---|
| JP | 2009-171635 | 7/2009 |
| JP | 2010-72740 | 4/2010 |

OTHER PUBLICATIONS

Harnil et. al., Side Channels in Cloud Services, 2010.*
Karthikeyan et. al., Data Deduplication with Security in Cloud Data Centres, 2015.*
Office Action dated Jan. 16, 2018, in corresponding Japanese Patent Application No. 2014-116257, 7 pgs.

* cited by examiner

FIG. 6

| HASH VALUE | IDENTIFIER |
|---|---|
| h(A) | idA |
| h(C) | idC |
| h(E) | idE |
| ⋮ | ⋮ |
| h(X) | idX |

FIG. 7

| IDENTIFIER | ENCRYPTION KEY |
|---|---|
| idA | KA |
| idC | KC |
| idE | KE |
| ⋮ | ⋮ |
| idX | KX |

FIG. 9

| IDENTIFIER | ADDRESS |
|---|---|
| idA | addrA |
| idC | addrC |
| idE | addrE |
| ⋮ | ⋮ |
| idX | addrX |

FIG. 10

| ADDRESS | ENCRYPTED SEGMENT |
|---|---|
| addrA | e(A) |
| addrC | e(C) |
| addrE | e(E) |
| ⋮ | ⋮ |
| addrX | e(X) |

FIG. 20

| HASH VALUE | ENCRYPTION KEY |
|---|---|
| h(A) | KA |
| h(C) | KC |
| h(E) | KE |
| ⋮ | ⋮ |
| h(X) | KX |

FIG. 21

| HASH VALUE | ENCRYPTED SEGMENT |
|---|---|
| h(A) | e(A) |
| h(C) | e(C) |
| h(E) | e(E) |
| ⋮ | ⋮ |
| h(X) | e(X) |

APPARATUS AND METHOD FOR SECURE TRANSMISSION AVOIDING DUPLICATE DATA

CROSS-REFERENCE TO RELATED APPLICATION

This application is based upon and claims the benefit of priority of the prior Japanese Patent Application No. 2014-116257, filed on Jun. 4, 2014, the entire contents of which are incorporated herein by reference.

FIELD

The embodiments discussed herein are related to apparatus and method for secure transmission avoiding duplicate data.

BACKGROUND

A conventional technique for avoiding transmission of duplicate data is disclosed that stores transmitted data in a cache in a transmission node, also stores received data in the cache in a reception node, and transmits only an identifier from the transmission node to the reception node when re-transmission of the transmitted data is requested.

More specifically, transmission of data including segments A, B, and C from user A to user B (step (1)) as illustrated in FIG. 1 is discussed. In this case, when transmitted segments A, C, and E are stored in a cache of node B, node A transmits the segment B, an identifier "a" of the segment A and an identifier "c" of the segment C to the node B (step (2)).

Since received segments A, C and E are stored in the cache of the node B, the node B reads the segments A and C from the cache by using the received identifiers "a" and "c" of the segments A and C, and outputs the segments A and C to the user B together with the received segment B (step (3)).

Thus, transmission of duplicate data is suppressed even in a communication between different users. More specifically, as illustrated in FIG. 2, users X and W are connected to the node A, and users Y and Z are connected to the node B. Assume that first, the user X transmits data including segments A, B, C, and D to the user Y. Then, when the user X transmits data including the segments A, B, C, and D to the node A (step (11)), the node A stores the segments A, B, C, and D into the cache (step (12)), and transmits the segments to the node B (step (13)).

Upon receiving the segments A, B, C, and D, the node B stores the segments into the cache (step (14)), and transmits the segments A, B, C, and D to the user Y (step (15)).

Assume that thereafter, as illustrated in FIG. 3, the user W transmits data including the segments B, C, D, and E to the user Z. In this case, the user W transmits data including the segments B, C, D, and E to the node A (step (21)). For the transmitted segments B, C, and D stored in the cache, the node A identifies identifiers "b", "c", and "d" thereof, and stores, in the cache, the segment E, which is not stored in the cache (step (22)). Then, the node A transmits identifiers "b", "c", and "d" of the transmitted segments, and the segment E to the node B (step (23)).

The node B stores, in the cache, the segment E which is received from the node A but not stored in the cache (step (24)), reads, from the cache, the segments B, C, and D associated with received identifiers "b", "c", and "d", and transmits the segments B, C, D, and E to the user Z (step (25)).

Thus, as for the segments, only the untransmitted segment E is transmitted at the stage illustrated in FIG. 3, and accordingly, communication traffic between the nodes A and B is reduced.

However, data of the segments is stored as is in the cache of the node A and the cache of the node B. In such a case, when an irrelevant third user makes unauthorized access to the node A or B and unlawfully checks the cache, data of the segment is leaked.

Related techniques are disclosed in, for example, Japanese Laid-open Patent Publication Nos. 2010-072740 and 2009-171635.

SUMMARY

According to an aspect of the invention, an apparatus determines whether encrypted data is stored in the memory in association with an identifier contained in data received from another communication device, decodes, when it is determined that the encrypted data is stored in the memory in association with the identifier contained in the received data, the encrypted data with an encryption key contained in the received data, and outputs the decoded data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an example of data stored in a hash data storage unit, according to an embodiment;

FIG. 7 is a diagram illustrating an example of data stored in an encryption key storage unit, according to an embodiment;

FIG. 9 is a diagram illustrating an example of data stored in an index storage unit, according to an embodiment;

FIG. 10 is a diagram illustrating an example of data stored in an encryption cache, according to an embodiment;

FIG. 20 is a diagram illustrating an example of data used in a transmission node, according to a second embodiment;

FIG. 21 is a diagram illustrating an example of data used in a reception node, according to a second embodiment;

DESCRIPTION OF EMBODIMENT

Embodiment 1

Figure 1:
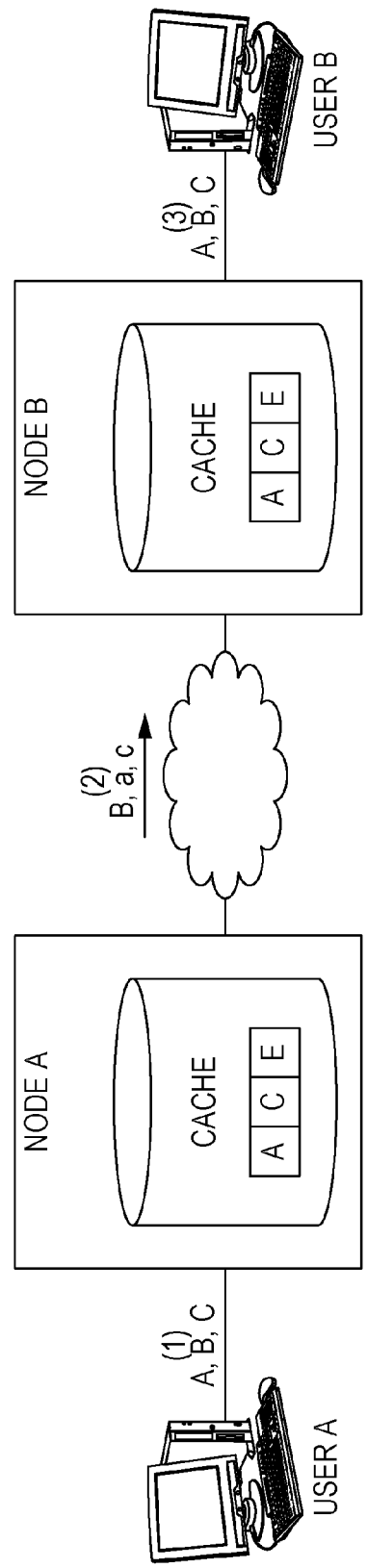
FIG. 1 is a diagram illustrating an example of a conventional technique.
Figure 2:
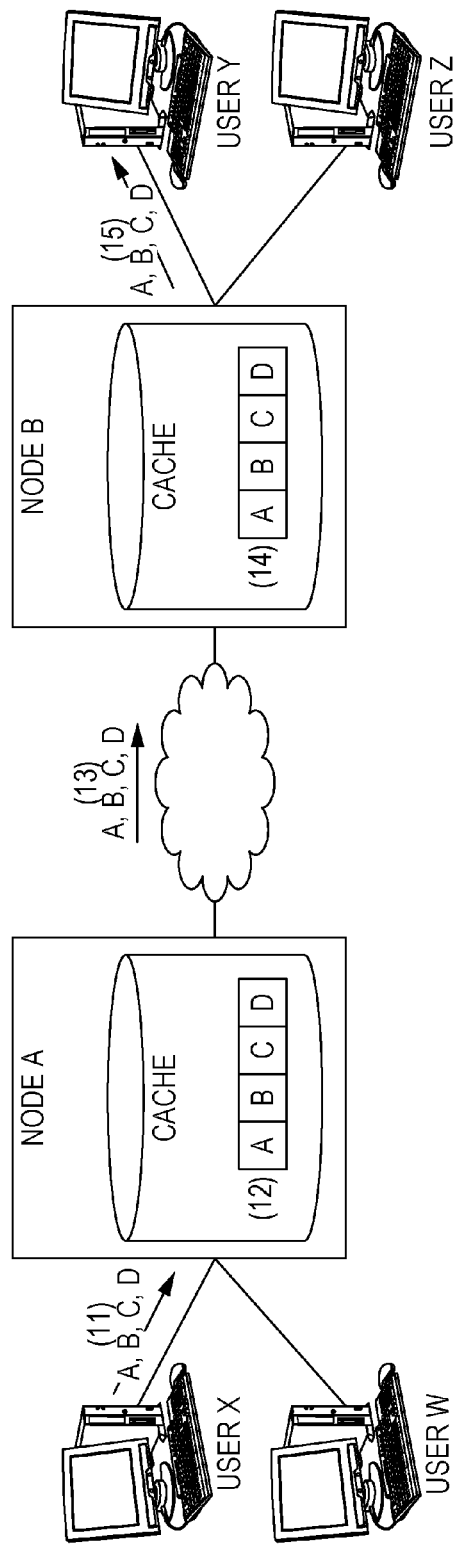
FIG. 2 is a diagram illustrating an example of a conventional technique.
Figure 3:
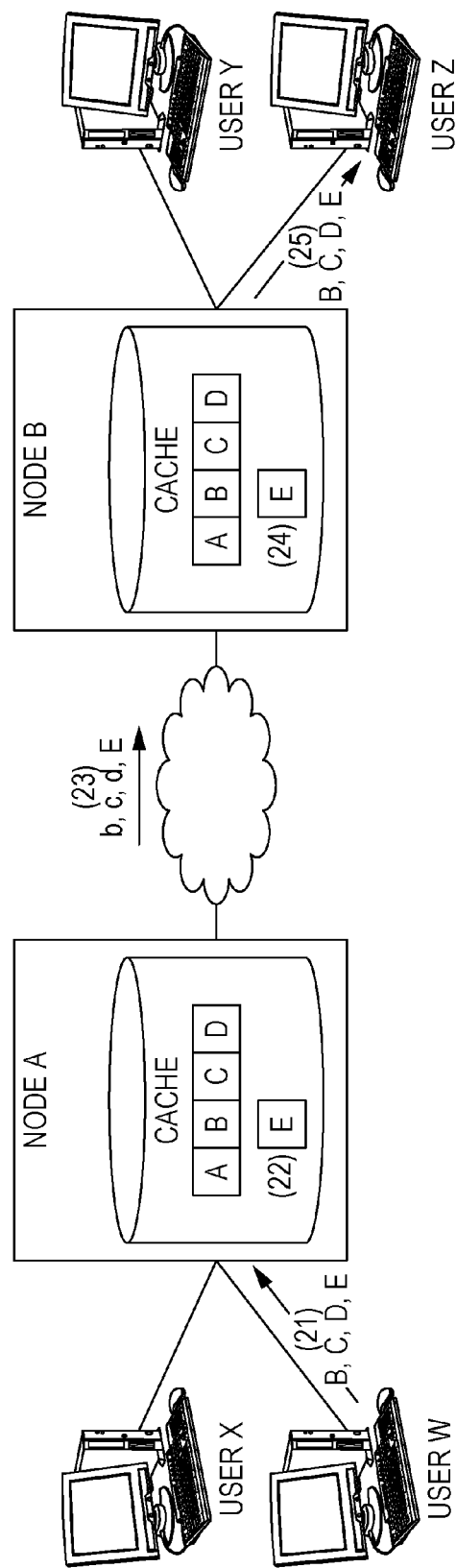
FIG. 3 is a diagram illustrating an example of a conventional technique.
Figure 4:
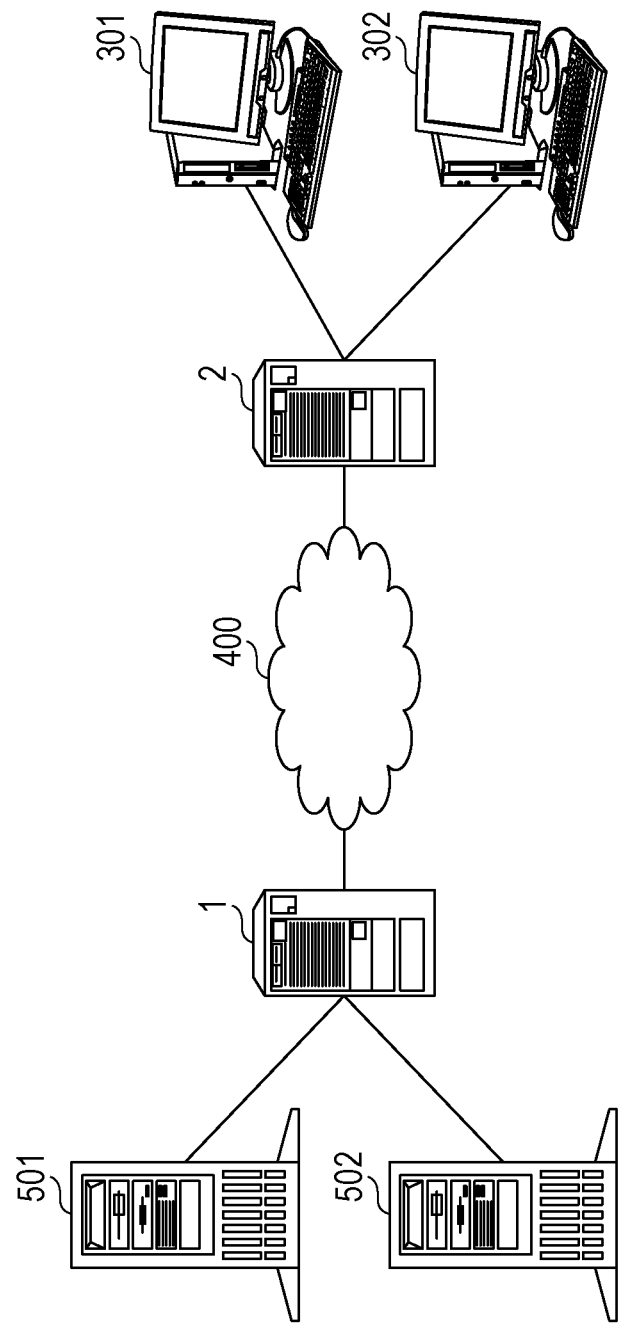
FIG. 4 is a schematic diagram illustrating an example of a system, according to an embodiment.

FIG. 4 is a schematic diagram illustrating an example of a system, according to an embodiment. In this system, a node 1 and a node 2 are connected to each other via a network 400. The node 1 is connected to information processing devices 501, and 502, which are, for example, file servers. The node 2 is connected to terminal devices 301, and 302. For example, when request for a file is transmitted from the terminal device 301 to the information processing device 501 via the node 2, the network 400, and the node 1, the information processing device 501 transmits data of a file relating to the request to the request source terminal device 301. Similarly, when request for the file containing the same content is transmitted from the terminal device 302 to the information processing device 502 via the node 2, the network 400, and the node 1, the information processing device 502 transmits data of the file relating to the request to the request source terminal device 302. In such a case, data amount communicated between the node 1 and the node 2 is reduced.

Figure 5:
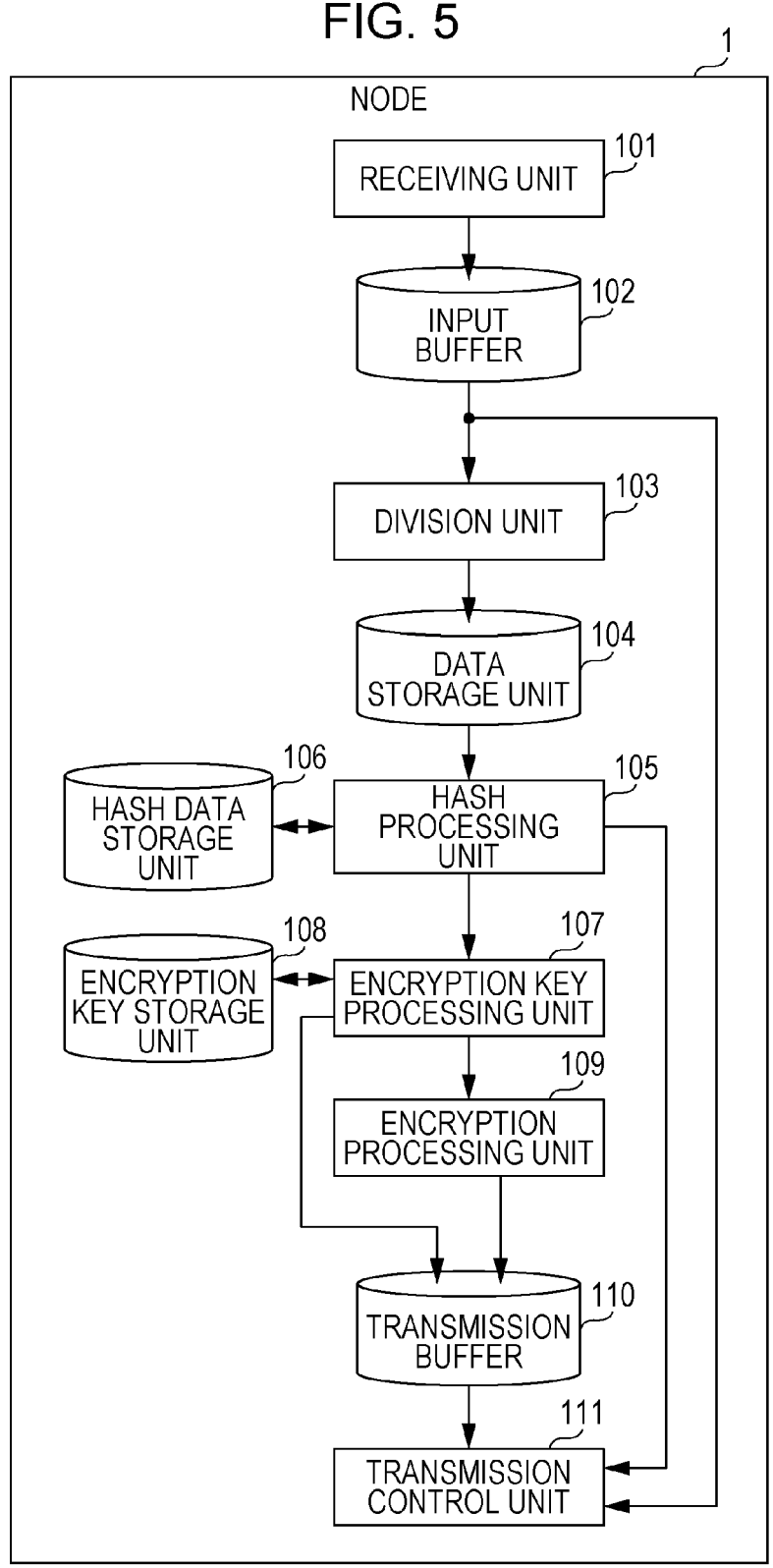
FIG. 5 is a diagram illustrating an example of a configuration of a transmission node, according to an embodiment.

Next, a configuration example of the node 1 is illustrated in FIG. 5. The node 1 includes a receiving unit 101, an input buffer 102, a division unit 103, a data storage unit 104, a hash processing unit 105, a hash data storage unit 106, an encryption key processing unit 107, an encryption key storage unit 108, an encryption processing unit 109, a transmission buffer 110, and a transmission control unit 111.

The receiving unit 101 receives data, for example, from the information processing device 501 and stores the data in the input buffer 102. The division unit 103 divides the data stored in the input buffer 102 to multiple segments in accordance with a predetermined rule, and stores the processing result in the data storage unit 104.

The hash processing unit 105 calculates a hash value of a segment stored in the data storage unit 104, and determines whether the identifier of the segment is registered, by searching the hash data storage unit 106 with the hash value.

For example, data such as illustrated in FIG. 6 is stored in the hash data storage unit 106. In the example of FIG. 6, a hash value of a segment, and an identifier of the segment are associated with each other.

When an identifier of the segment is not registered in the hash data storage unit 106, the hash processing unit 105 generates the identifier of the segment, and stores the identifier in the hash data storage unit 106 in association with the calculated hash value.

When an identifier of the segment is registered, the encryption key processing unit 107 receives the identifier of the segment from the hash processing unit 105, and reads the encryption key by searching the encryption key storage unit 108 with the received identifier of the segment.

On the other hand, when a new identifier of the segment is generated, the encryption key processing unit 107 receives the segment and the identifier thereof from the hash processing unit 105, generates an encryption key, and stores the encryption key into the encryption key storage unit 108 in association with the identifier of the segment.

The encryption key storage unit 108 stores data, for example, such as those illustrated in FIG. 7. In the example of FIG. 7, an identifier of a segment and an encryption key of the segment are associated with each other.

Then, when an identifier of a segment and an encryption key of the segment are registered in the encryption key storage unit 108, the identifier of the segment and the encryption key of the segment are stored in the transmission buffer 110.

On the other hand, when an identifier of the segment and an encryption key of the segment are newly registered in the encryption key storage unit 108, the encryption key processing unit 107 outputs the segment, and the identifier and encryption key thereof to the encryption processing unit 109.

Upon receiving the segment, and the identifier and encryption key thereof from the encryption key processing unit 107, the encryption processing unit 109 encrypts the segment with the encryption key, and stores the identifier and the encryption key of the segment and the encrypted segment into the transmission buffer 110.

The transmission control unit 111 transmits data stored in the transmission buffer 110 to the node 2 along with destination data stored in the input buffer 102.

Figure 8:
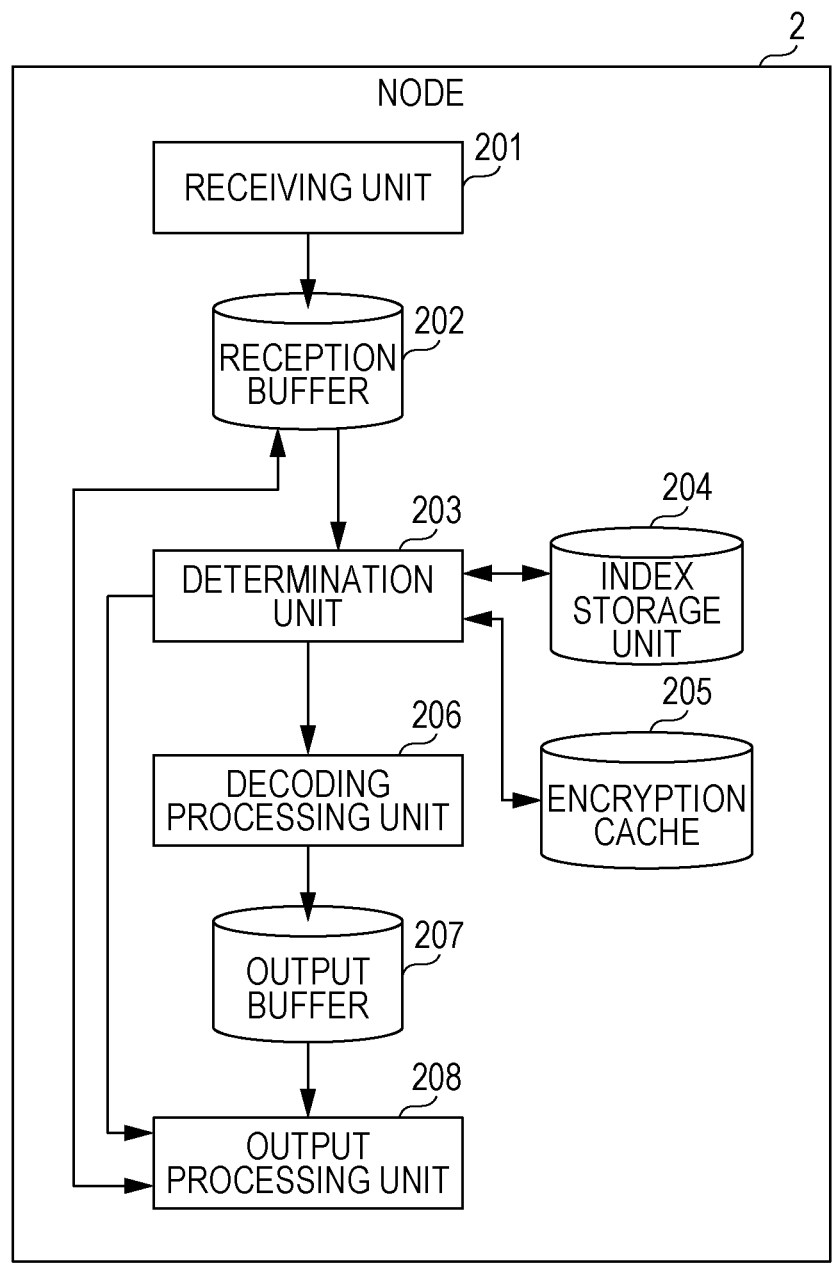
FIG. 8 is a diagram illustrating an example of a configuration of a reception node, according to an embodiment.

Next, a configuration example of the node 2 is illustrated in FIG. 8. The node 2 includes a receiving unit 201, a reception buffer 202, a determination unit 203, an index storage unit 204, an encryption cache 205, a decoding processing unit 206, an output buffer 207, and an output processing unit 208.

Upon receiving data from the node 1, the receiving unit 201 stores the data into the reception buffer 202.

The determination unit 203 determines whether the encrypted segment is registered, by searching the index storage unit 204 with an identifier of the segment stored in the reception buffer 202. When the encrypted segment is registered, the determination unit 203 reads an address that is stored in the index storage unit 204 in association with the identifier of the segment, and reads the encrypted segment from the encryption cache 205.

On the other hand, when an identifier of the segment is not registered, the determination unit 203 stores, in the encryption cache 205, the encrypted segment stored in the reception buffer 202, and stores a storage destination address in the index storage unit 204 in association with the identifier of the segment.

The index storage unit 204 stores data, for example, such as those illustrated in FIG. 9. In the example of FIG. 9, the identifier of the segment and the storage destination address of the encrypted segment are associated with each other.

The encryption cache 205 stores data, for example, as illustrated in FIG. 10. In the example of FIG. 10, data of the encrypted segment is stored in association with the address. The encrypted segment is stored, for example, in a ring buffer.

Then, the determination unit 203 outputs the encrypted segment and the encryption key stored in the reception buffer 202, to the decoding processing unit 206.

The decoding processing unit 206 performs processing of decoding the encrypted segment with the encryption key, and stores the processing result into the output buffer 207.

The output processing unit 208 outputs data of the segment stored in the output buffer 207 to a destination whose information is stored in the reception buffer 202.

Figure 11:
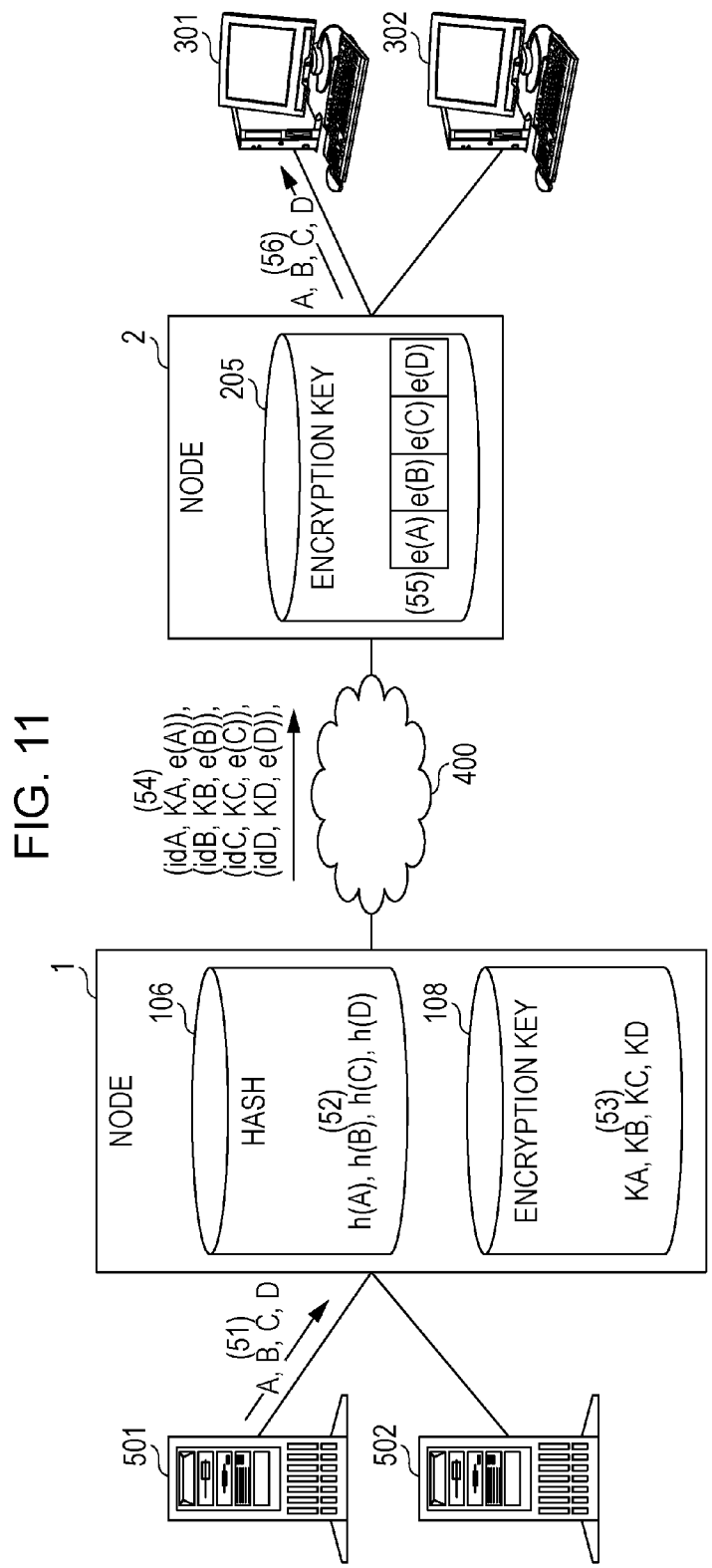
FIG. 11 is a schematic diagram illustrating an example of processing, according to a first embodiment.

Then, an overview of the processing according to the embodiment is described with reference to FIGS. 11 and 12. First, a case in which the information processing device 501 transmits data including segments A, B, C, and D to the terminal device 301 as illustrated in FIG. 11 is discussed. In this case, the information processing device 501 transmits data including segments A, B, C, and D to the node 1 (step (51)).

Upon receiving data including segments A, B, C, and D, the node 1 determines whether hash values thereof h(A), h(B), h(C), and h(D) are registered in the hash data storage unit 106. Here, assuming that the hash values are not registered, the node 1 generates identifiers idA, idB, idC, and idD for respective segments, and registers hash values h(A), h(B), h(C), and h(D) in the hash data storage unit 106 (step (52)). Since no encryption keys are registered, the node 1 generates encryption keys KA, KB, KC, and KD for the respective segments, and stores the segments into the encryption key storage unit 108 (step (53)).

Then, the node 1 transmits, to the node 2 via the network 400, an identifier idA, an encryption key KA, and an encrypted segment e(A) for the segment A; an identifier idB, an encryption key KB, and an encrypted segment e(B) for the segment B; an identifier idC, an encryption key KC, and an encrypted segment e(C) for the segment C; and an identifier idD, an encryption key KD, and an encrypted segment e(D) for the segment D (step (54)). This communication may be encrypted.

Upon receiving data from the node 1, the node 2 determines whether an encrypted segment associated with the received identifier is registered in the encryption cache 205. In this case, assuming that the segments are not registered, the node 2 registers encrypted segments e(A), e(B), e(C), and e(D) into the encryption cache 205 (step (55)).

Then, the node 2 decodes the encrypted segments e(A), e(B), e(C), and e(D) by using the received encryption keys KA, KB, KC, and KD, and outputs the decoded data A, B, C, and D to the terminal device 301 (step (56)).

After completion of decoding, the node 2 deletes the encryption keys without saving.

Thus, encrypted segments are maintained in the node 2 only, and encryption keys are maintained in the node 1 only. Therefore, in order to obtain the content of the segments by unauthorized access, data need to be read by accessing both the nodes 1 and 2. Accordingly, the security level is improved.

Figure 12:
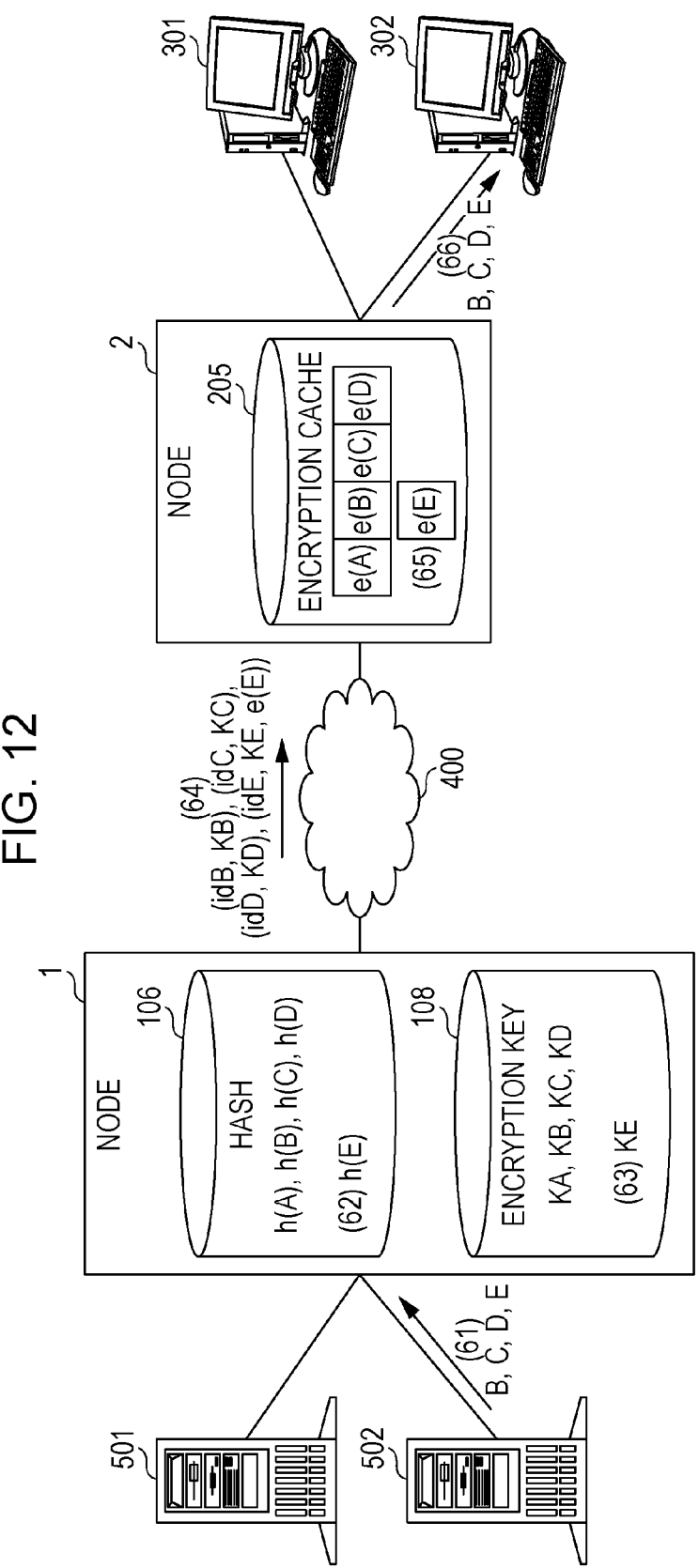
FIG. 12 is a schematic diagram illustrating an example of processing, according to a first embodiment.

Next, a case in which the information processing device 502 transmits data including segments B, C, D, and E to the terminal device 302 as illustrated in FIG. 12 is discussed. In this case, the information processing device 502 transmits data including segments B, C, D, and E to the node 1 (step (61)).

Upon receiving data including segments B, C, D, and E, the node 1 determines whether hash values thereof h(B), h(C), h(D), and h(E) are registered in the hash data storage unit 106. The node 1 determines that hash values h(B), h(C), and h(D) are registered, but the a hash value h(E) is not registered. Then, the node 1 generates an identifier idE for the segment E, and registers a hash value h(E) into the hash data storage unit 106 (step (62)). Since the encryption key is also not registered, the node 1 generates an encryption key KE for the segment E, and stores the encryption key KE into the encryption key storage unit 108 (step (63)).

Then, the node 1 transmits, to the node 2 via the network 400, an identifier idB and an encryption key KB for the segment B of which hash value is registered; an identifier idC and an encryption key KC for the segment C of which hash value is registered; an identifier idD and an encryption key KD for the segment D of which hash value is registered; and an identifier idE and an encryption key KE for the segment E of which hash value is not registered (step (64)).

Thus, only the encrypted segment e(E) for the untransmitted segment E is transmitted, thereby reducing data amount communicated via the network 400.

Upon receiving data from the node 1, the node 2 determines whether an encrypted segment associated with the received identifier is registered in the encryption cache 205. In this case, encrypted segments e(B), e(C), and e(D) are registered in the encryption cache 205, but the encrypted segment e(E) is not registered. Accordingly, the node 2 registers the encrypted segment e(E) in the encryption cache 205 (step (65)).

Then, by using the received encryption keys KB, KC, KD, and KE, the node 2 reads encrypted segments e(B), e(C), and e(D) from the encryption cache 205, decodes the segments, decodes received data for the encrypted segment e(E), and outputs decoded data B, C, D, and E to the terminal device 301 (step (66)).

Thus, only the encrypted segment e(E) for the untransmitted segment E is transmitted, thereby reducing data amount communicated via the network 400. Also, as described with reference to FIG. 11, encryption keys are maintained in the node 1 only, and encrypted segments are maintained in the node 2 only. Therefore, the security level against unauthorized access is enhanced.

Next, detailed processing contents are described with reference to FIGS. 13 to 19.

Figure 13:
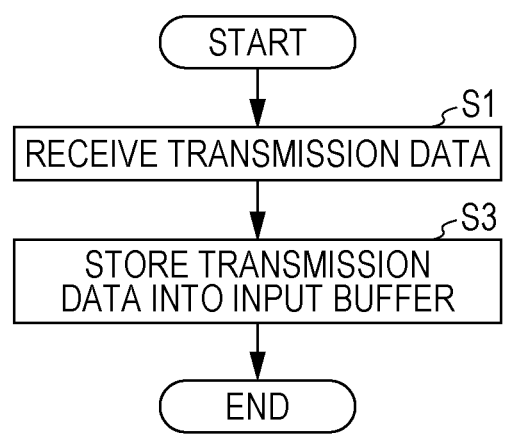
FIG. 13 is a diagram illustrating an example of an operational flowchart for a transmission node, according to an embodiment.

First, content processing of the node 1 is described with reference to FIGS. 13 to 15.

Upon receiving transmission data from the information processing device 501 or 502 (FIG. 13: step S1), the receiving unit 101 of the node 1 stores the transmission data into the input buffer 102 (step S3).

Figure 14:
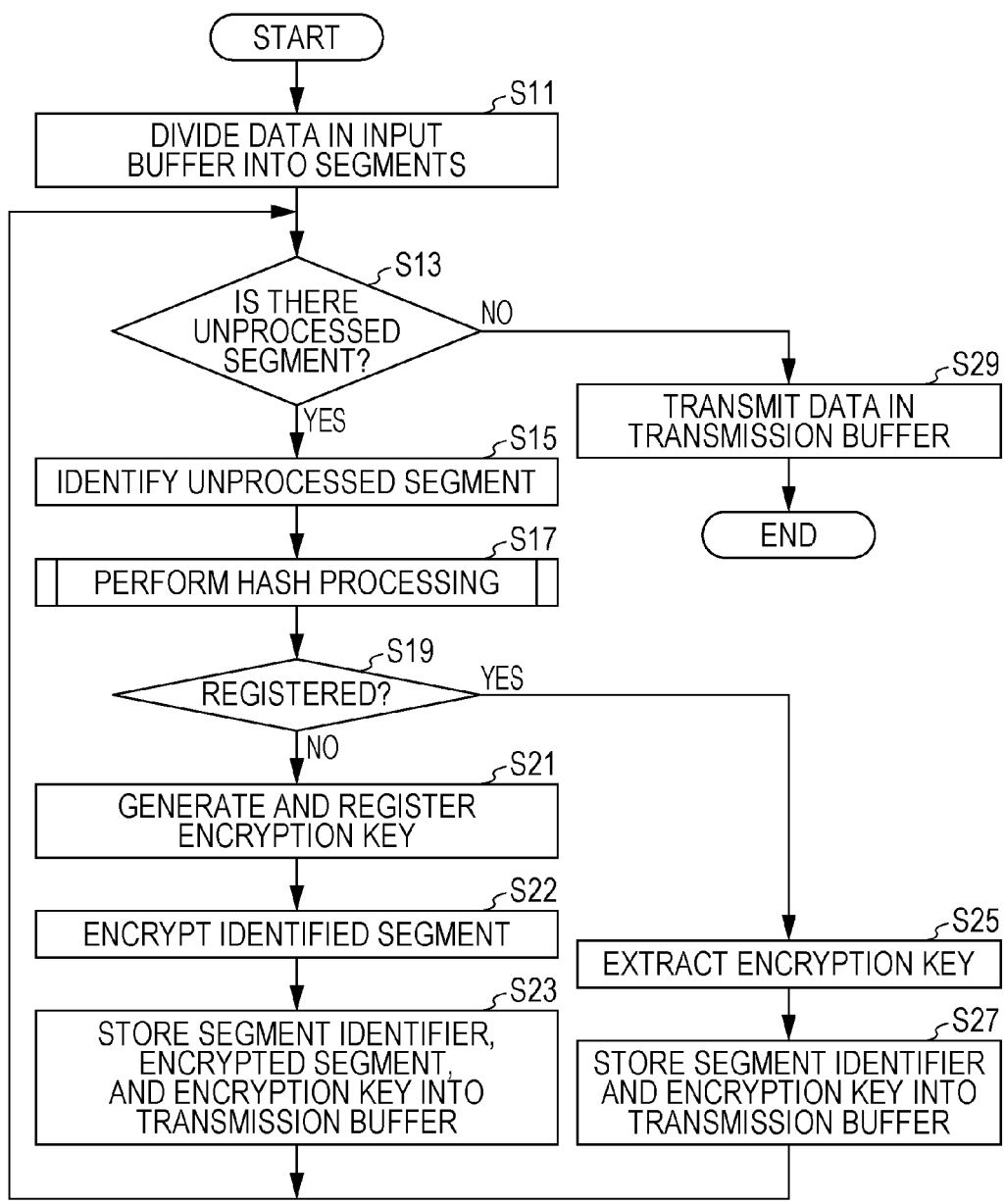
FIG. 14 is a diagram illustrating an example of an operational flowchart for a transmission node, according to an embodiment.

Then, the division unit 103 of the node 1 reads data from the input buffer 102, divides the data into segments, and stores the segments into the data storage unit 104 (FIG. 14: step S11). Segment division may be performed with a desired method. For example, a method disclosed by Japanese Laid-open Patent Publication No. 2009-171635 may be adopted.

Then, the hash processing unit 105 determines whether there exists an unprocessed segment in the data storage unit 104 (step S13). When an unprocessed segment exists (step S13: Yes route), the hash processing unit 105 identifies the unprocessed segment (step S15), and performs hash processing on the unprocessed segment (step S17). The hash processing is described with reference to FIG. 15.

Figure 15:
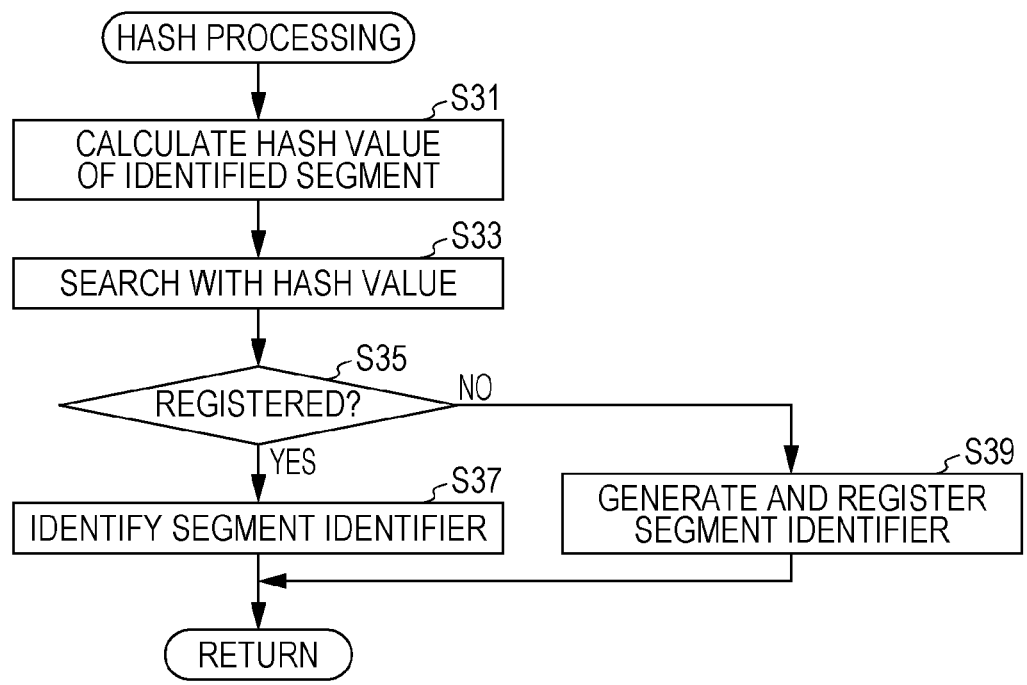
FIG. 15 is a diagram illustrating an example of an operational flowchart for hash processing, according to an embodiment.

The hash processing unit 105 calculates a hash value of the identified segment (FIG. 15: step S31). A secure hash, for example, such as SHA1 is preferably used as the hash function.

The hash processing unit 105 searches the hash data storage unit 106 with the calculated hash value (step S33).

When the calculated hash value has been already registered (step S35: Yes route), the hash processing unit 105 identifies an identifier of the segment associated with the calculated hash value in the hash data storage unit 106 (step S37). Then, the process returns to a call source processing.

On the other hand, when the calculated hash value is not registered (step S35: No route), the hash processing unit 105 generates an identifier of the segment, associates the identifier with the calculated hash value, and stores the identifier of the segment into the hash data storage unit 106 (step S39). Then, the process returns to a call source processing.

Then, when the hash value is registered, the hash processing unit 105 outputs the identifier of the segment to the encryption key processing unit 107. When the hash value is not registered, the hash processing unit 105 outputs the segment and the identifier thereof to the encryption key processing unit 107.

Referring back to description of FIG. 14, the encryption key processing unit 107 determines whether the encryption key is registered (step S19), from data received from the hash processing unit 105 (that is, data indicating whether the segment is received or not). When not registered (step S19: No route), the encryption key processing unit 107 generates an encryption key of the identified segment, associates the encryption key with the identifier of the segment, and stores the encryption key into the encryption key storage unit 108 (step S21). Further, the encryption key processing unit 107 outputs the segment and the encryption key to the encryption processing unit 109.

The encryption processing unit 109 encrypts the segment with the encryption key (step S22), and stores the identifier of the segment, the encrypted segment, and the encryption key into the transmission buffer 110 (step S23).

On the other hand, when the encryption key is registered (step S19: Yes route), the encryption key processing unit 107 reads the encryption key associated with the identifier of the segment from the encryption key storage unit 108 (step S25), and stores the identifier of the segment and the encryption key into the transmission buffer 110 (step S27).

After the step S23 or the step S27, the process returns to the step S13.

Then, when there exists no unprocessed segments left (step S13: No route), the hash processing unit 105 requests the transmission control unit 111 to perform processing. In response to the request, the transmission control unit 111 acquires destination data from the input buffer 102 and so on, and transmits the data to the node 2 along with data stored in the transmission buffer 110 (step S29).

By performing such processing, a combination of the identifier and the encryption key of the segment is transmitted for a transmitted segment, and a combination of the identifier and the encryption key of the segment, and the encrypted segment is transmitted for an untransmitted segment.

Next, detailed processing content of the node 2 is described with reference to FIGS. 16 to 17.

Figure 16:
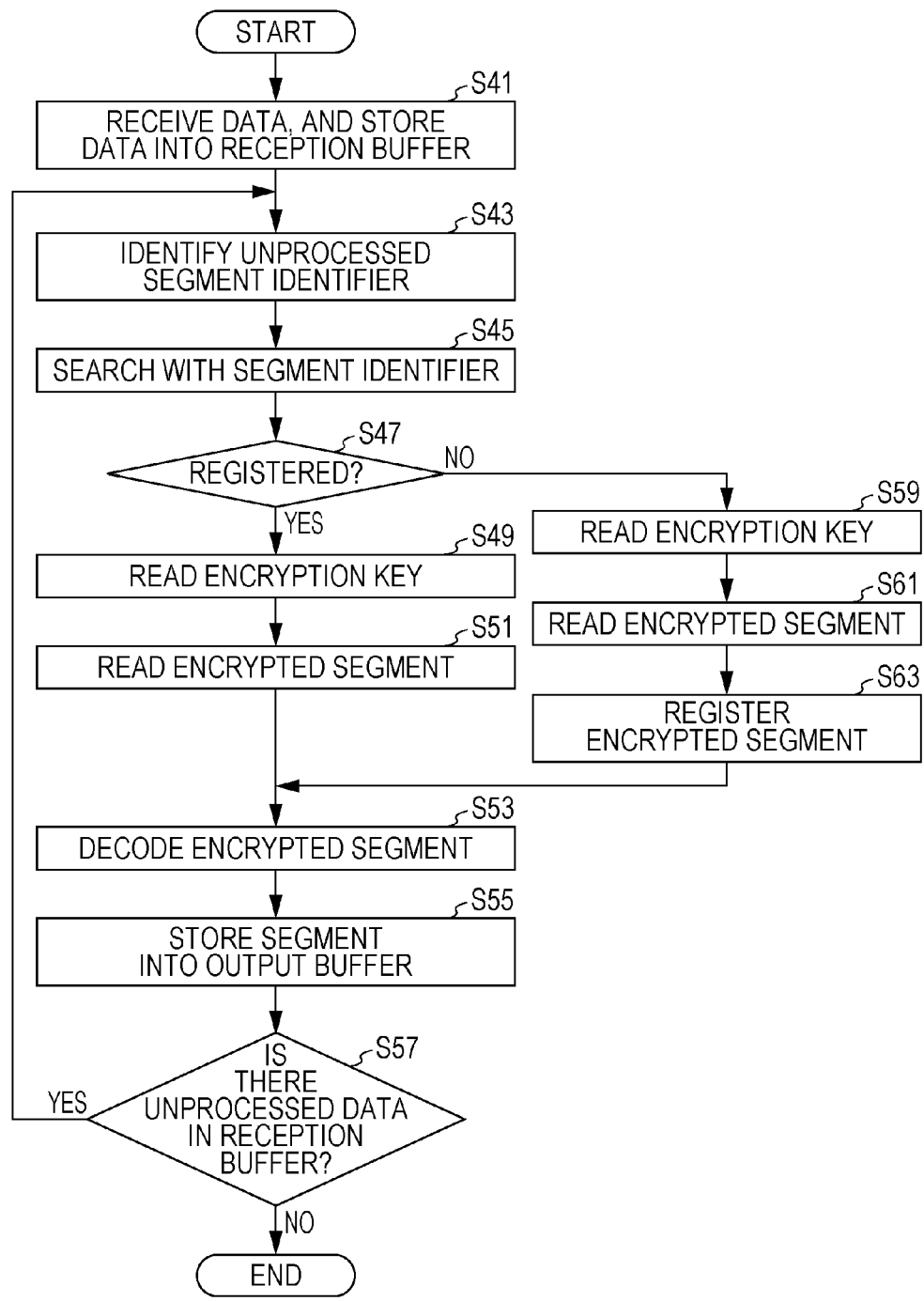
FIG. 16 is a diagram illustrating an example of an operational flowchart for a reception node, according to an embodiment.
Figure 17:
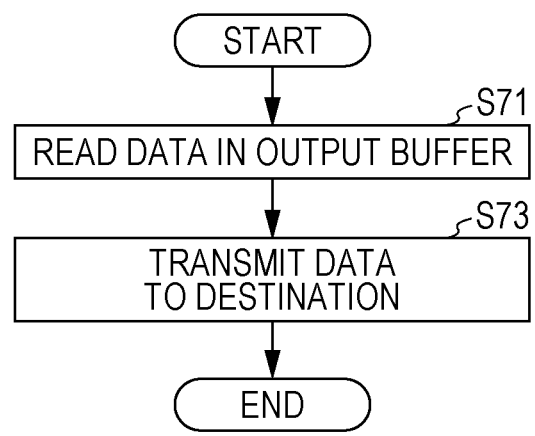
FIG. 17 is a diagram illustrating an example of an operational flowchart for a reception node, according to an embodiment.

Upon receiving data from the node 1, the receiving unit 201 stores the data into the reception buffer 202 (FIG. 16: step S41). The received data contains destination data.

Then, the determination unit 203 identifies one unprocessed segment identifier contained in the received data within the reception buffer 202 (step S43). Then, the determination unit 203 searches the index storage unit 204 with the identified segment identifier (step S45).

When the segment identifier is registered in the index storage unit 204 (step S47: Yes), the determination unit 203 reads an encryption key associated with the segment identifier from the reception buffer 202 (step S49). Further, the determination unit 203 reads an address in the encryption cache 205 associated with the segment identifier, and reads an encrypted segment by using the address (step S51). Then, the determination unit 203 outputs the encryption key and the encrypted segment to the decoding processing unit 206. The decoding processing unit 206 decodes the encrypted segment with the encryption key received from the determination unit 203 (step S53), and stores the segment into the output buffer 207 (step S55).

On the other hand, when the segment identifier is not registered in the index storage unit 204 (step S47: No route), the determination unit 203 reads an encryption key associated with the segment identifier from the reception buffer 202 (step S59), and reads the encrypted segment from the reception buffer 202 (step S61). Then, the determination unit 203 stores the encrypted segment into the encryption cache 205, and stores a storage destination address into the index storage unit 204 in association with the segment identifier (step S63). Then, the determination unit 203 outputs the encryption key and the encrypted segment to the decoding processing unit 206. Then, the process proceeds to the step S53.

The determination unit 203 determines whether there exists unprocessed data in the reception buffer 202 (step S57). When there exists unprocessed data (step S57: Yes route), the process returns to the step S43. When there exists no unprocessed data (step S57: No route), the determination unit 203 instructs the output processing unit 208 to perform processing. Then, processing illustrated in FIG. 17 is performed by the output processing unit 208.

That is, the output processing unit 208 reads data within the output buffer 207 (step S71), reads destination data stored in the reception buffer 202, and transmits the read data to the destination (step S73). At this stage, for example, the data in the reception buffer 202 is deleted.

By performing processing described above, security level is improved, and retransmission of duplicate data may be avoided.

Figure 18:
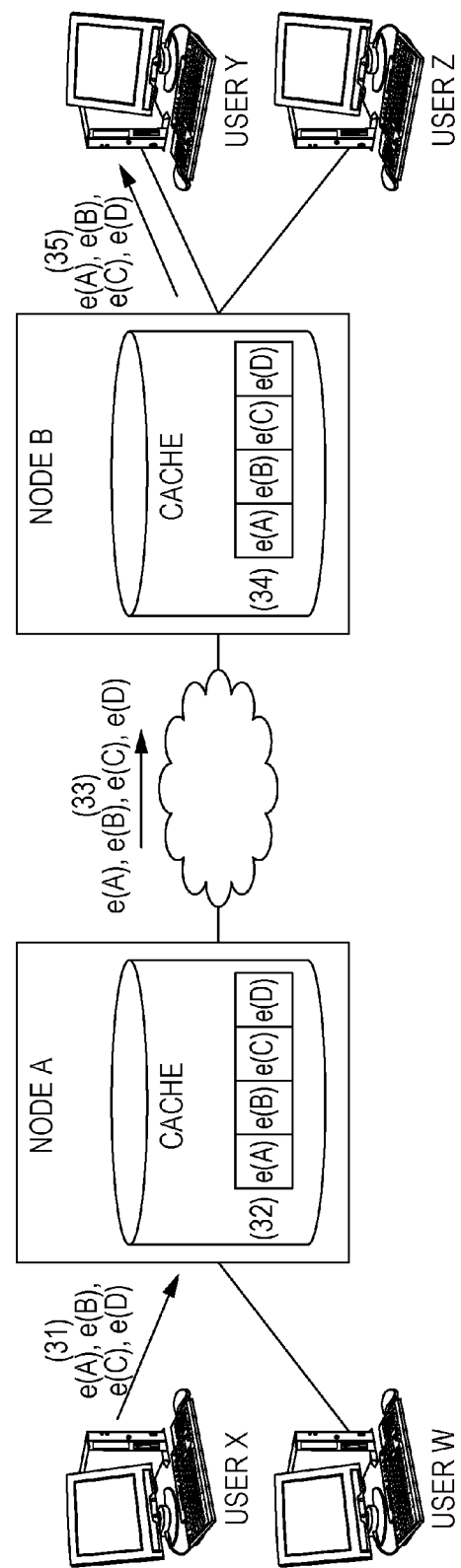
FIG. 18 is a diagram illustrating a comparative example of processing.

Communication using a common key for each of communication partners may be considered to improve the security level. For example, assume that communication between the user X and the user Y is encrypted with a first common key, as illustrated in FIG. 18. The user X generates segments e(A), e(B), e(C), and e(D) that are encrypted with the first common key from segments A, B, C, and D to be transmitted, and transmits the encrypted segments to the node A (step (31)).

Since encrypted segments e(A), e(B), e(C), and e(D) are not stored in the cache of the node A, the node A stores the encrypted segments e(A), e(B), e(C), and e(D) into the cache (step (32)). Also, the node A transmits encrypted segments e(A), e(B), e(C), and e(D) to the node B (step (33)).

Since encrypted segments e(A), e(B), e(C), and e(D) are also not stored in the cache of the node B, the node B stores the encrypted segments e(A), e(B), e(C), and e(D) into the cache (step (34)). Then, the node B transmits encrypted segments e(A), e(B), e(C), and e(D) to the user Y (step (35)).

Figure 19:
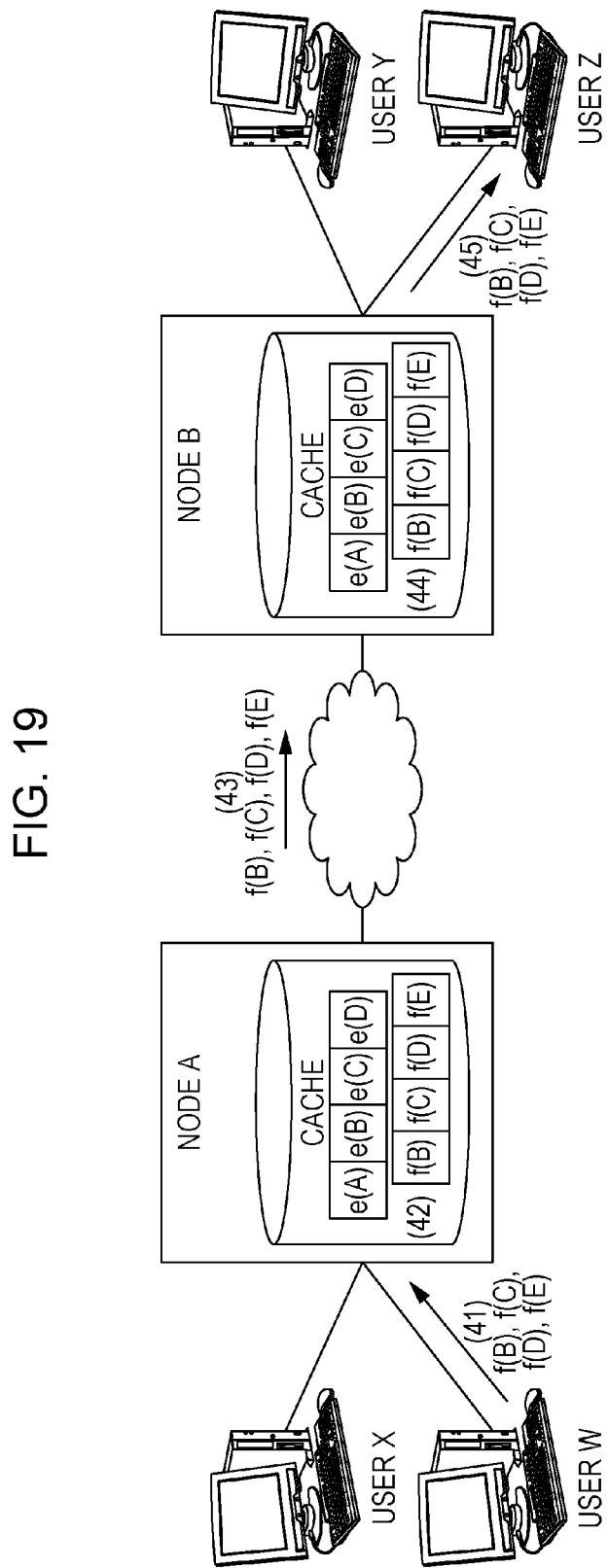
FIG. 19 is a diagram illustrating a comparative example of processing.

Assume that communication between the user W and the user Z is encrypted with a second common key different from the first common key, as illustrated in FIG. 19. The user W generates segments f(B), f(C), f(D), and f(E) encrypted with the second common key from segments B, C, D, and E to be transmitted, and transmits the encrypted segments to the node A (step (41)).

In the cache of the node A, encrypted segments e(A), e(B), e(C), and e(D) are stored, but encrypted segments f(B), f(C), and f(D) are not stored since encryption keys used for those segments are different from each other although the source segments are same. Accordingly, the node A stores the encrypted segment f(B), f(C), f(D), and f(E) into the cache (step (42)). The node A also transmits encrypted segments f(B), f(C), f(D), and f(E) to the node B (step (43)).

Since encrypted segments f(B), f(C), f(D), and f(E) are also not stored in the cache of the node B, the node B stores the encrypted segments f(B), f(C), f(D), and f(E) into the cache (step (44)). Then, the node B transmits encrypted segments f(B), f(C), f(D), and f(E) to the user Z (step (45)).

When using such a security measure of simply encrypting data between users, duplicate data is not removed since data of the same source segment turns different data once encrypted.

On the contrary, the segment-based encryption between nodes as performed in the embodiment enables efficient duplication removal while improving the security level.

Embodiment 2

In the first embodiment, the segment identifier different from the hash value is used. But, there is a case where the segment identifier is not used. That is, the hash value of the segment may be used as a segment identifier.

For example, data such as illustrated in FIG. 20 may be used by integrating the hash data storage unit 106 and the encryption key storage unit 108 to each other in the node 1. In the example of FIG. 20, encryption keys are registered in association with hash values.

When such data is stored, for example, in the hash data storage unit 106, searching of the encryption key storage unit 108 may be omitted.

Similarly, in the node 2, the index storage unit 204 and the encryption cache 205 may be integrated to each other. For example, data such as illustrated in FIG. 21 may be used. In the example of FIG. 21, an encrypted segment is stored in association with a hash value.

When such data is stored, for example, in the encryption cache 205, searching of the index storage unit 204 may be omitted.

Figure 22:
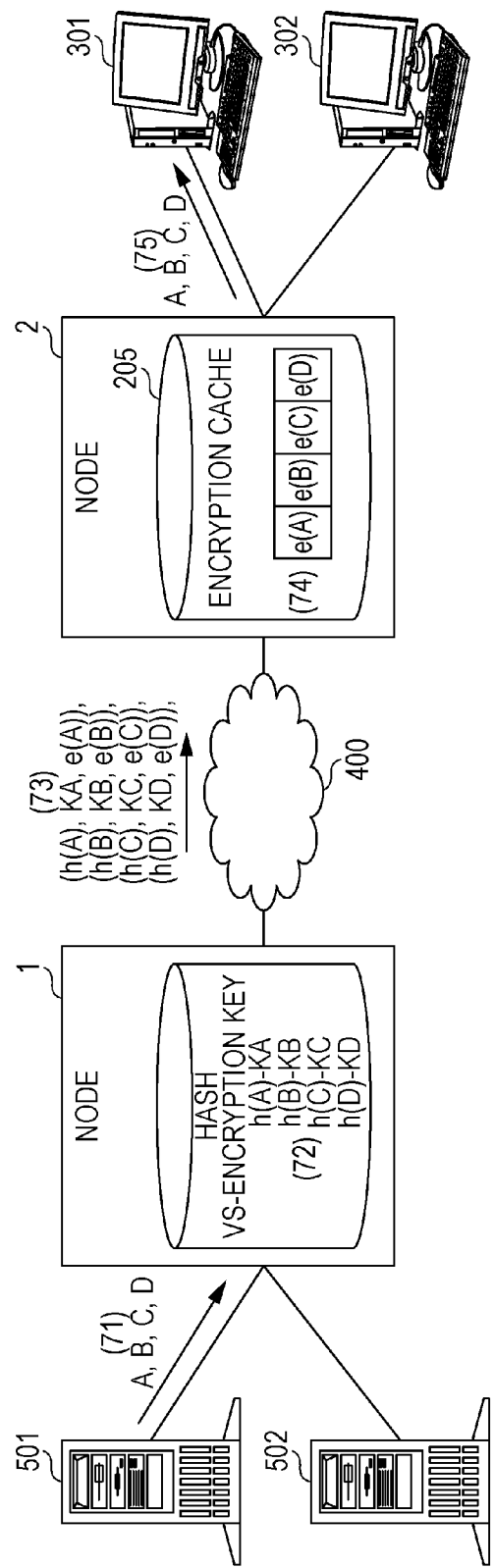
FIG. 22 is a schematic diagram illustrating an example of processing, according to a second embodiment.

Due to such variation, data transmitted from the node 1 to the node 2 also becomes different. An overview of processing according to the embodiment is described with reference to FIG. 22. First, a case in which the information processing device 501 transmits data including segments A, B, C, and D to the terminal device 301 is discussed. In this case, the information processing device 501 transmits data including segments A, B, C, and D to the node 1 (step (71)).

Upon receiving data including segments A, B, C, and D, the node 1 determines whether hash values thereof h(A), h(B), h(C), and h(D) are registered in, for example, the hash data storage unit 106. Here, assuming that the hash values are not registered, the node 1 generates encryption keys KA, KB, KC, and KD for respective segments, and stores the encryption keys KA, KB, KC, and KD in association with hash values h(A), h(B), h(C), and h(D) (step (72)).

Then, the node 1 transmits, to the node 2 via the network 400, a hash value h(A), an encryption key KA, and an encrypted segment e(A) for the segment A; a hash value h(B), an encryption key KB, and an encrypted segment e(B) for the segment B; a hash value h(C), an encryption key KC, and an encrypted segment e(C) for the segment C; and a hash value h(D), an encryption key KD, and an encrypted segment e(D) for the segment D (step 73)). This communication may be encrypted.

Upon receiving data from the node 1, the node 2 determines whether an encrypted segment associated with a received hash value is registered in the encryption cache 205. In this case, assuming that the segments are not registered, the node 2 registers encrypted segments e(A), e(B), e(C), and e(D) in the encryption cache 205 in association with hash values h(A), h(B), h(C), and h(D) respectively (74)).

Then, the node 2 decodes the encrypted segments e(A), e(B), e(C), and e(D) by using the received encryption keys KA, KB, KC, and KD, and outputs decoded data A, B, C, and D to the terminal device 301 (step (75)). After completion of decoding, the node 2 deletes the encryption keys without saving.

Figure 23:
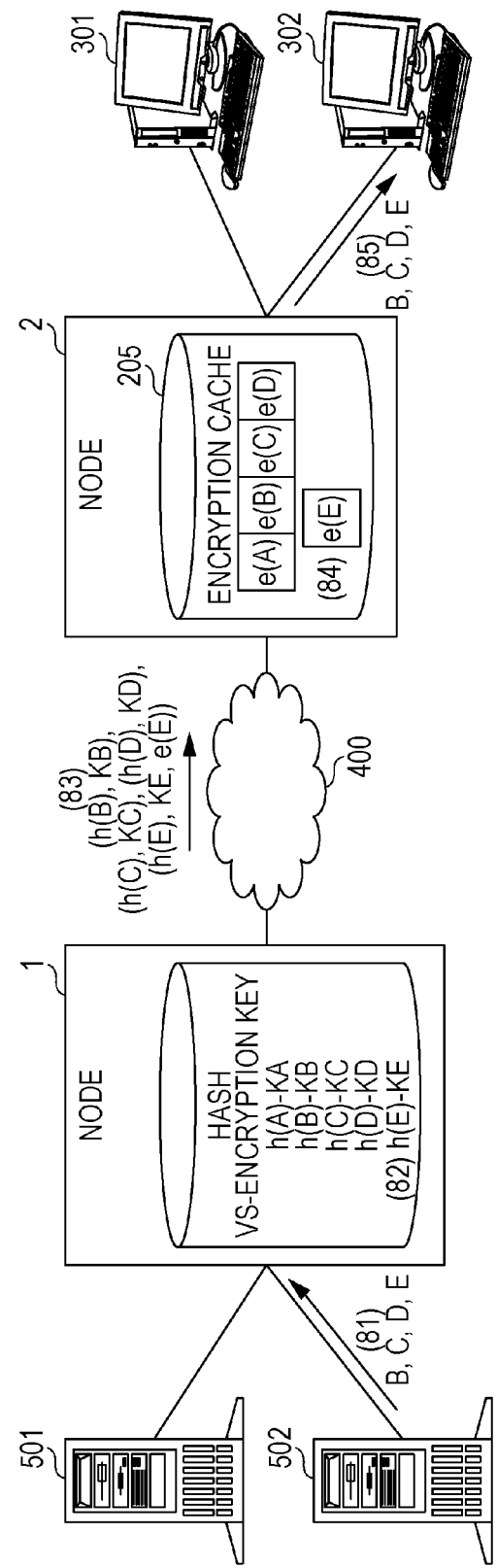
FIG. 23 is a schematic diagram illustrating an example of processing, according to a second embodiment.

Then, a case in which the information processing device 502 transmits data including segments B, C, D and E to the terminal device 302 as illustrated in FIG. 23 is discussed. In this case, the information processing device 502 transmits data including segments B, C, D, and E to the node 1 (step (81)).

Upon receiving data including segments B, C, D, and E, the node 1 determines whether hash values thereof h(B), h(C), h(D), and h(E) are registered in the hash data storage unit 106. The node 1 determines that hash values h(B), h(C), and h(D) are registered, but the a hash value h(E) is not registered. Then, the node 1 generates an encryption key KE for the segment E, and stores the encryption key KE in association with the hash value h(E), for example, into the hash data storage unit 106 (step (82)).

Then, the node 1 transmits, to the node 2 via the network 400, the hash value h(B) and the encryption key KB for the segment B of which hash value is registered; the hash value h(C) and the encryption key KC for the segment C of which hash value is registered; the hash value h(D) and the encryption key KD for the segment D of which hash value is registered; and the hash value h(E) and the encryption key KE for the segment E of which hash value is not registered (step (83)).

Upon receiving data from the node 1, the node 2 determines whether an encrypted segment associated with the received hash value is registered in the encryption cache 205. In this case, encrypted segments e(B), e(C), and e(D) are registered in the encryption cache 205, but the encrypted segment e(E) is not registered. Accordingly, the node 2 registers the encrypted segment e(E) in the encryption cache 205 in association with the hash value h(E) (step (84)).

Then, by using the received encryption keys KB, KC, KD, and KE, the node 2 reads encrypted segments e(B), e(C), and e(D) from the encryption cache 205, to decode the read segments; decodes received data for the encrypted segment e(E); and outputs decoded data B, C, D, and E to the terminal device 301 (step (85)).

In this way, in the second embodiment, a hash value is transmitted instead of a segment identifier, retransmission of duplicate data is avoided while improving the security level.

Embodiment 3

To address unauthorized access to the nodes 1 and 2, for example, a variation such as this embodiment may be adopted. More specifically, encryption processing is not performed in the node 1, but in the node 2.

Figure 24:
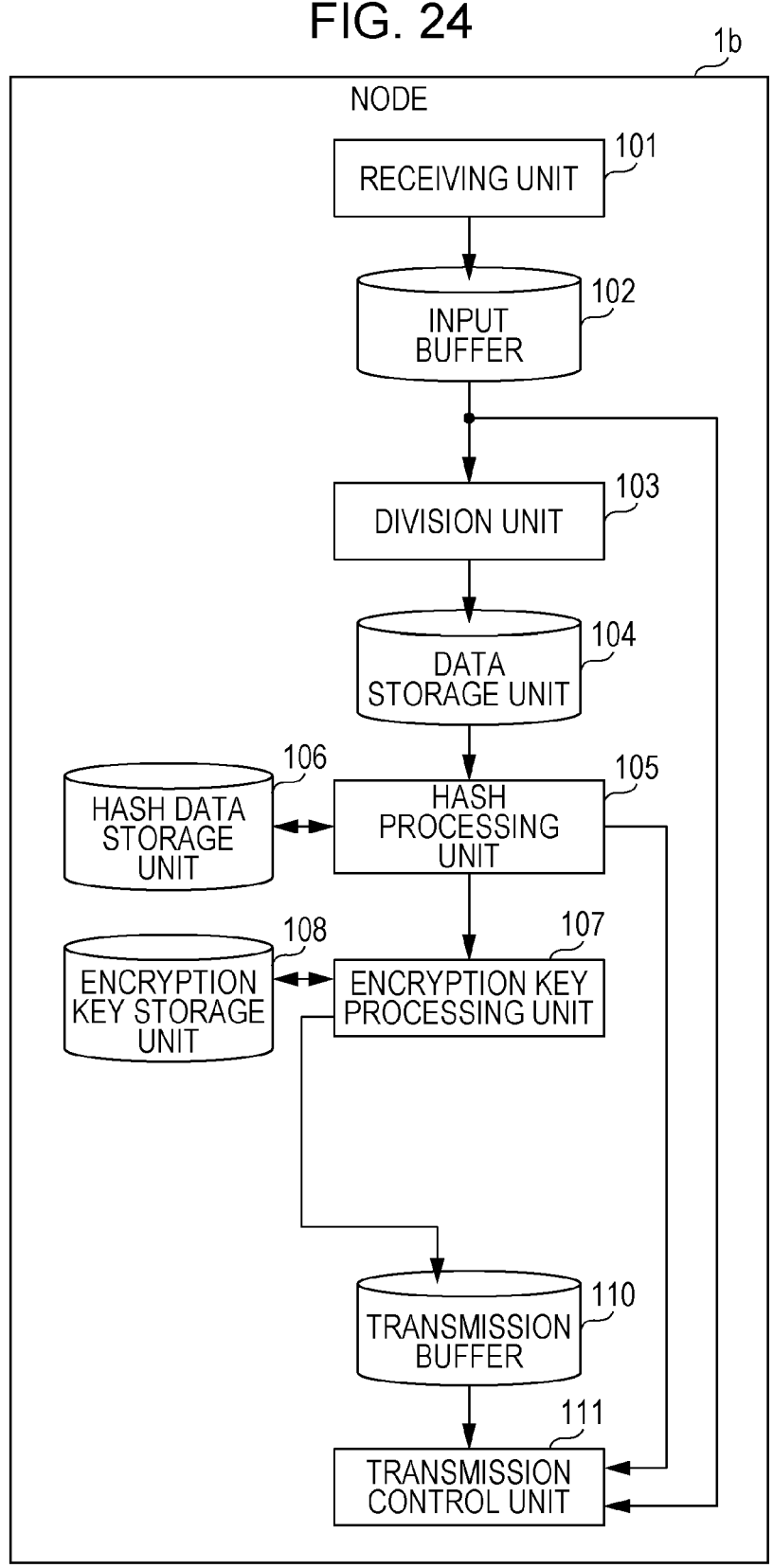
FIG. 24 is a diagram illustrating an example of a configuration of a transmission node, according to a third embodiment.

That is, the node 1 is modified to a node 1b as illustrated in FIG. 24. Compared with FIG. 5, the node 1b does not include the encryption processing unit 109.

The encryption key processing unit 107 stores the encryption key and the segment identifier into the transmission buffer 110 when the hash value is stored in the hash data storage unit 106. But, when the hash value is not stored in the hash data storage unit 106, the encryption key processing unit 107 stores the segment, together with the segment identifier thereof and the encryption key, into the transmission buffer 110.

Figure 25:
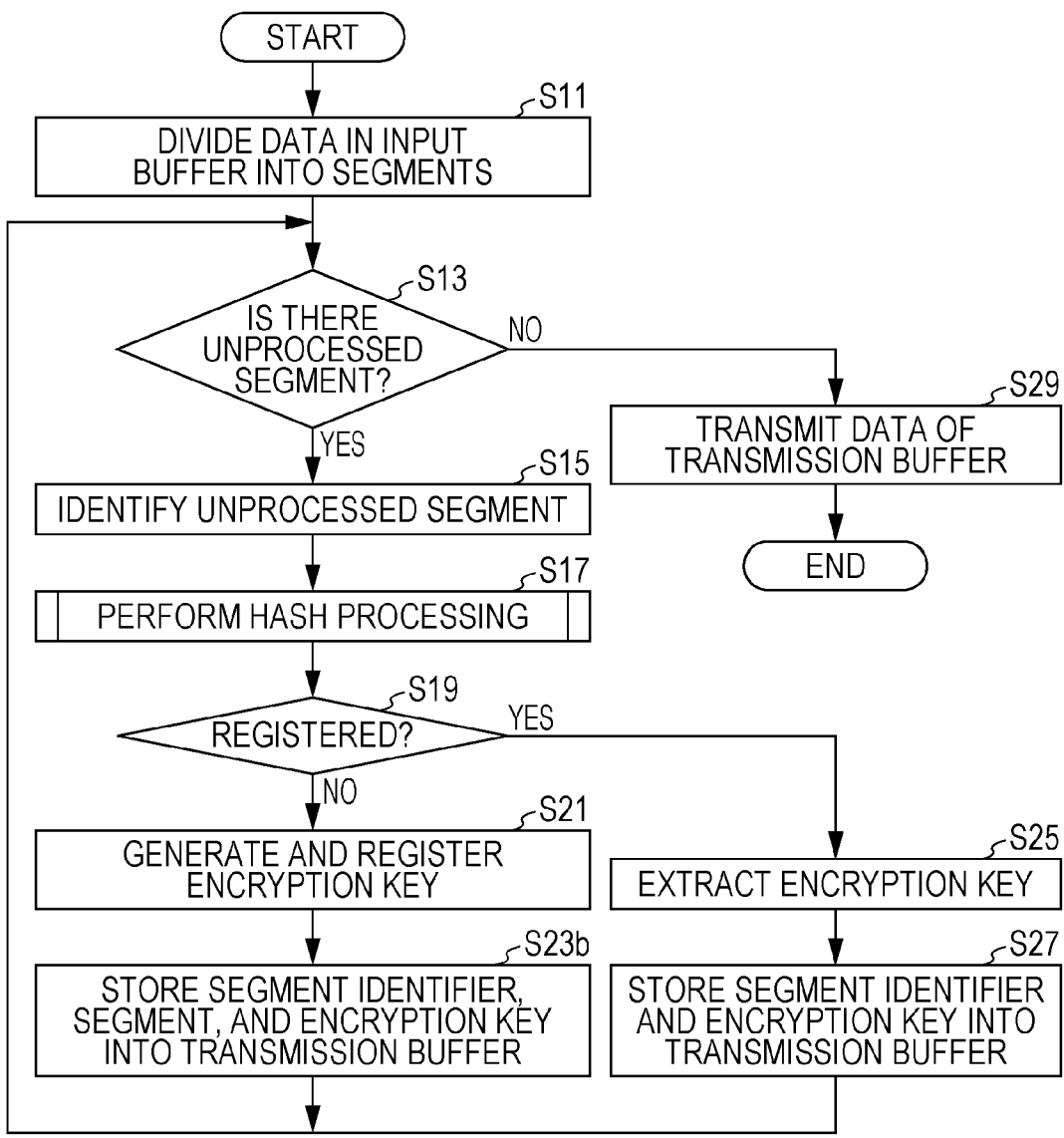
FIG. 25 is a diagram illustrating an example of an operational flowchart for a transmission node, according to a third embodiment.

Accordingly, the processing flow of FIG. 14 is also modified as illustrated in FIG. 25. However, as described above, encryption processing is not performed when the hash value is not stored in the hash data storage unit 106. Therefore, the step S22 is not performed, and the step S23b is performed instead of the step S23. At the step S23b, the encryption key processing unit 107 stores the segment identifier, the segment, and the encryption key into the transmission buffer 110.

Figure 26:
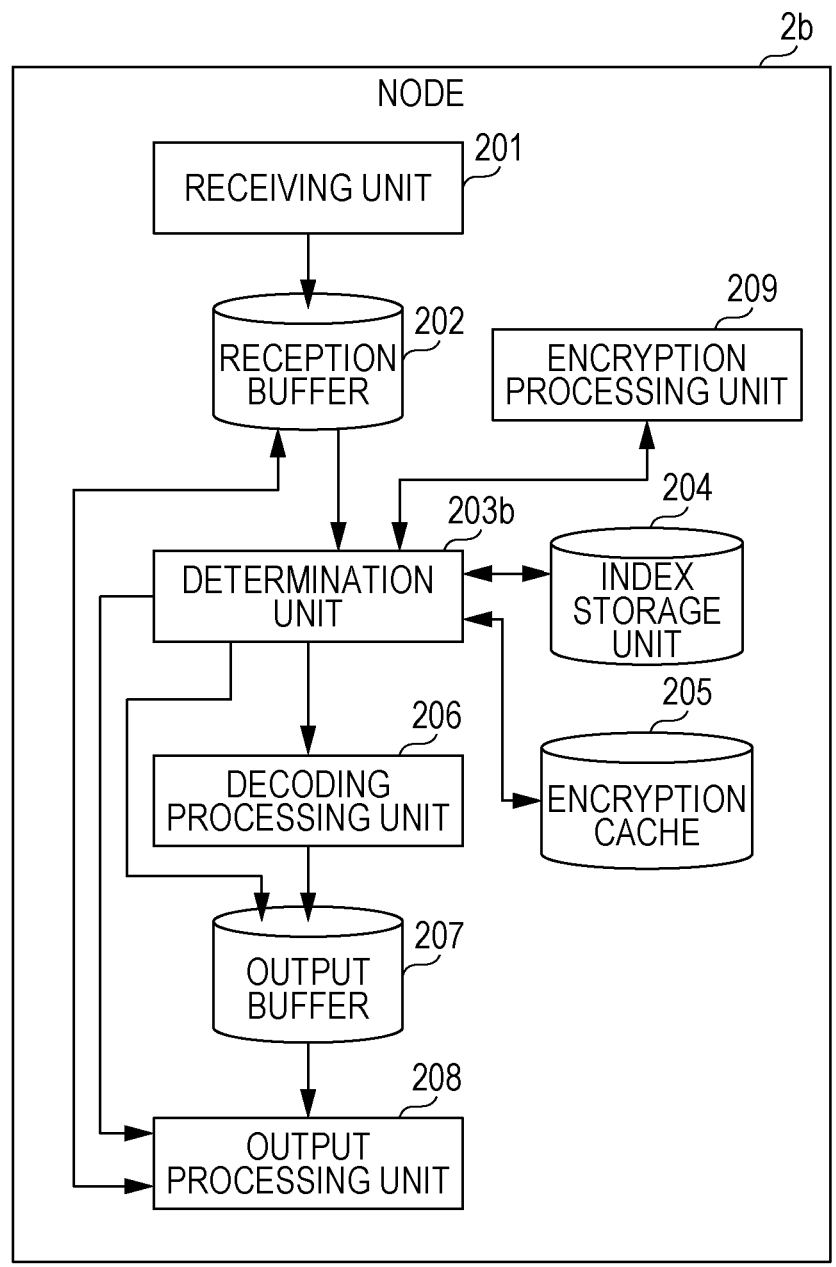
FIG. 26 is a diagram illustrating an example of a configuration of a reception node, according to a third embodiment.

On the other hand, the node 2 is modified to a node 2b as illustrated in FIG. 26. The configuration of FIG. 26 is different from that of FIG. 14 in that a determination unit 203b configured to perform processing different from the determination unit 203 is introduced in place of the determination unit 203, and an encryption processing unit 209 is added.

Figure 27:
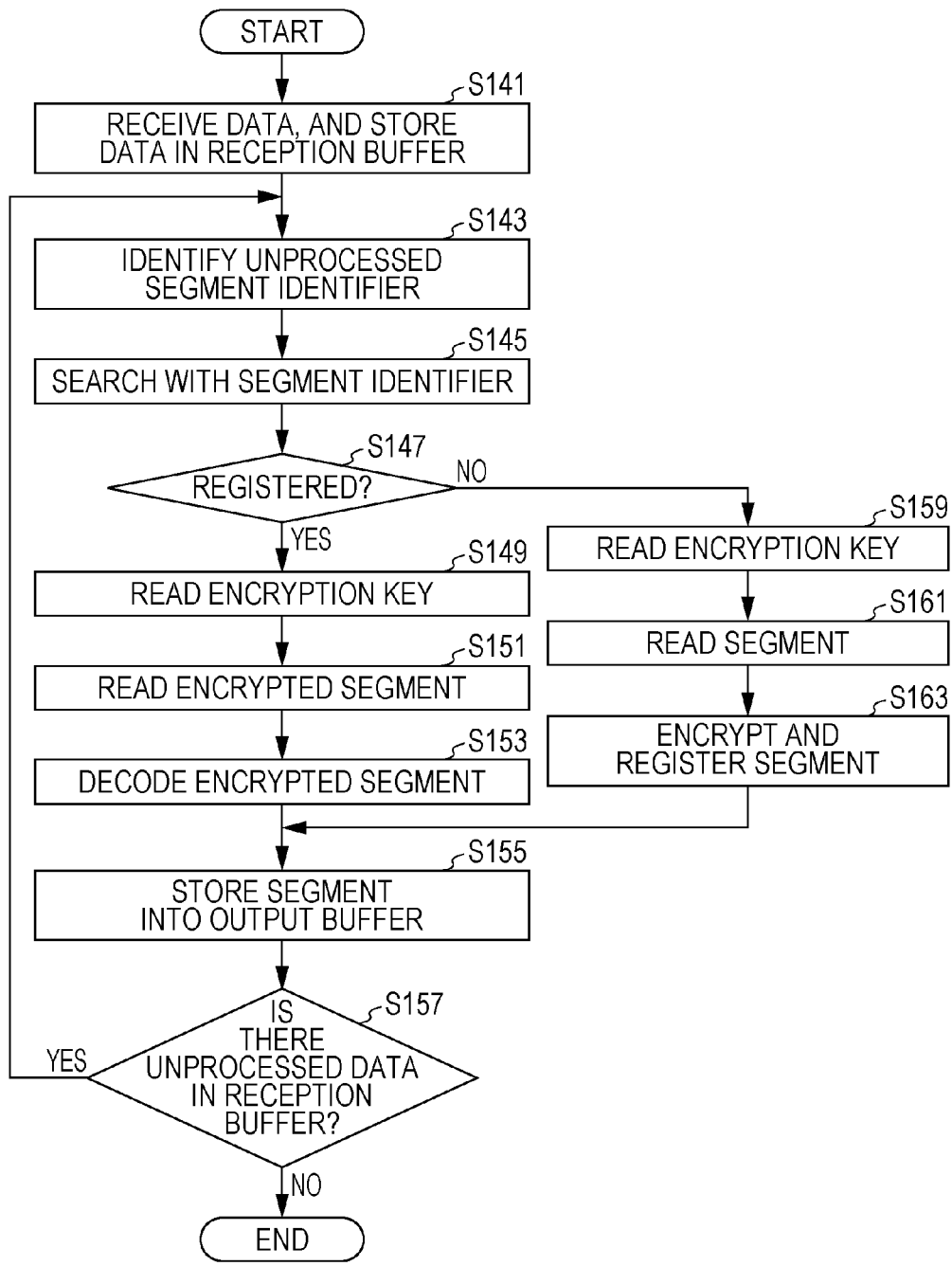
FIG. 27 is a diagram illustrating an example of an operational flowchart for a reception node, according to a third embodiment.

FIG. 27 is a diagram illustrating an example of an operational flowchart for processing of a reception node, according to a third embodiment.

Upon receiving data from the node 1b, the receiving unit 201 stores the data into the reception buffer 202 (FIG. 27: step S141). The received data includes destination data.

Then, the determination unit 203b identifies one unprocessed segment identifier contained in the received data within the reception buffer 202 (step S143). Then, the determination unit 203b searches the index storage unit 204 with the identified segment identifier (step S145).

When the segment identifier is registered in the index storage unit 204 (step S147: Yes), the determination unit 203b reads an encryption key associated with the segment identifier from the reception buffer 202 (step S149). Further, the determination unit 203b reads an address in the encryption cache 205 associated with the segment identifier, and reads an encrypted segment from the read address of the encryption cache 205 (step S151). Then, the determination unit 203b outputs the encryption key and the encrypted segment to the decoding processing unit 206. The decoding processing unit 206 decodes the encrypted segment with the encryption key received from the determination unit 203b (step S153), and stores the segment into the output buffer 207 (step S155). Processing up to this step is same as the first embodiment.

On the other hand, when the segment identifier is not registered in the index storage unit 204 (step S147: No route), the determination unit 203b reads an encryption key associated with the segment identifier from the reception buffer 202 (step S159), and reads the segment from the reception buffer 202 (step S161). Then, the determination unit 203b outputs the encryption key and the segment to the encryption processing unit 209, causes the encryption processing unit 209 to encrypt the segment, and acquires the encrypted segment. Then, the determination unit 203b stores the acquired encrypted segment into the encryption cache 205, and stores a storage destination address of the encrypted segment into the index storage unit 204 in association with the segment identifier (step S163). Then, the process proceeds to the step S155.

The determination unit 203b determines whether there exists unprocessed data in the reception buffer 202 (step S157). When there exists unprocessed data (step S157: Yes route), the process returns to the step S143. When there exists no unprocessed data (step S157: No route), the determination unit 203b instructs the output processing unit 208 to perform processing. Then, processing illustrated in FIG. 17 is performed by the output processing unit 208.

Performing communication between the node 1 and the node 2 by using a common encrypted communication may prevent the leakage of the segment. Further, since data is not restored unless the encryption key and the encrypted segment are obtained by making unauthorized access to both the node 1 and the node 2, retransmission of duplicate data may be avoided while improving the security level.

The second embodiment may be further applied to this embodiment.

Although embodiments of the present disclosure are described as above, the disclosure is not be limited thereto.

For example, the functional block configuration of nodes described above may be inconsistent with a program modular structure. Also, for the operational flowchart, the sequence may be changed, or multiple steps may be performed in parallel unless processing result varies.

Further, a node according to an embodiment may not be configured as one computer, and the functions thereof may be distributed among multiple computers.

Figure 28:
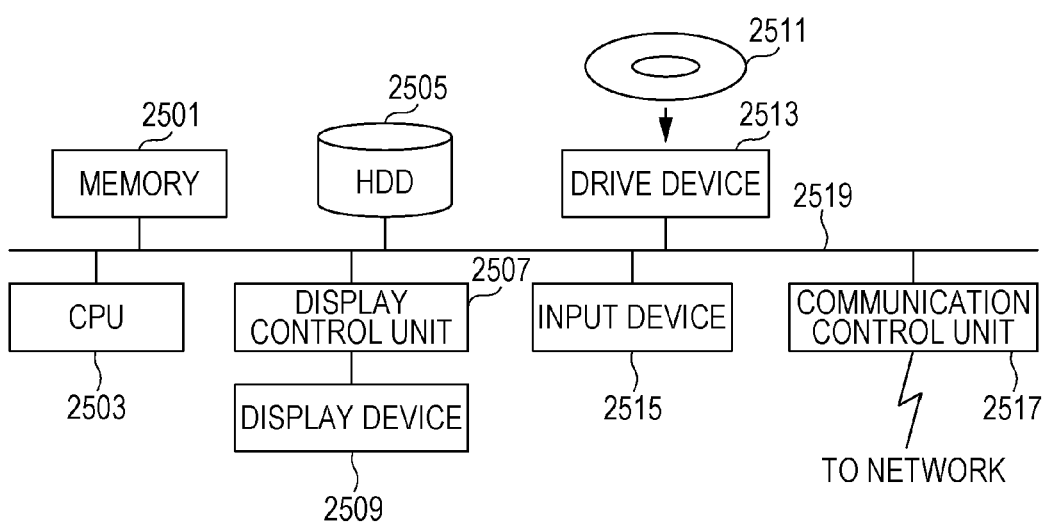
FIG. 28 is a diagram illustrating an example of a configuration of a computer, according to an embodiment.

Nodes 1, 1b, 2, and 2b, information processing devices 501 and 502, and terminal devices 301 and 302 described above are computer devices, and as illustrated in FIG. 28, the memory 2501, the Central Processing Unit (CPU) 2503, the hard disk drive (HDD) 2505, the display controller 2507 connected to the display device 2509, the drive device 2513 for the removable disk 2511, the input device 2515, and the communication controller 2517 for connecting to the network are connected with each other via the bus 2519. An operating system (OS) and an application program for executing processing according to the embodiments are stored in the HDD 2505, and, when executed by the CPU 2503, are read from the HDD 2505 to the memory 2501. The CPU 2503 controls the display controller 2507, the communication controller 2517, and the drive device 2513 according to processing content of the application program to perform a predetermined operation. Data being processed is mainly stored in the memory 2501, but may be stored in the HDD 2505. In the embodiments, an application program for performing processing described above is distributed by being stored in the computer readable removable disk 2511, and installed on the HDD 2505 from the drive device 2513. Also, the application program may be installed on the HDD 2505 via a network such as the internet and a communication control unit 2517. Such computer devices implement various functions as described above by organic co-working of the hardware, such as the CPU 2503 and memory 2501 as described above, and the programs, such as the OS, and the application program.

The embodiments described above are summarized below.

A communication device according to a first aspect of the embodiment (for example, a node 2 and so on in the embodiment) includes (A) a data storage unit configured to store encrypted data in association with an identifier (for example, an identifier or a hash value according to the embodiment), (B) a determination unit configured to determine whether encrypted data is stored in the data storage unit, in association with an identifier contained in data received from the other communication device, (C) a decoding processing unit configured to decode, with an encryption key contained in the received data, encrypted data stored in the data storage unit in association with the identifier, when the determination unit determines that encrypted data is stored in the data storage unit, in association with an identifier contained in the received data, and (D) an output unit configured to output data decoded by the decoding processing unit.

When encrypted data is stored in the data storage unit, it is not required that encrypted data is contained in data received from the other communication device, and thereby the amount of communication data may be reduced. Also, unless the encryption key is maintained in the communication device, data is not decoded even when the encrypted data is leaked by unauthorized access to the communication device. Thus, the security level is improved.

The determination unit described above may be configured (b1) to store encrypted data contained in received data into the data storage unit in association with an identifier contained in the received data, when encrypted data is not stored in the data storage unit in association with the identifier contained in the received data. In this case, the decoding processing unit described above may be configured (c1) to decode encrypted data contained in the received data with an encryption key contained in the received data, when the determination unit determines that encrypted data is not stored in the data storage unit in association with the identifier contained in the received data. This allows encrypted data received for the first time to be efficiently utilized later.

Further, the determination unit described above may be configured (b2) to store data obtained by encrypting information contained in the received data with an encryption key into the data storage unit, in association with the identifier, when encrypted data is not stored in the data storage unit in association with the identifier contained in the received data. In this case, the output unit described above may be configured (d1) to output information contained in the received data. As mentioned above, there may be a case where information is transmitted without being encrypted.

A communication device according to a second aspect of the embodiment includes (A) a data storage unit configured to store an encryption key in association with an identifier of transmitted data, (B) a processing unit configured to determine whether the encryption key is stored in the data storage unit in association with the identifier of data requested to transmit, and (C) a transmission control unit configured to transmit the identifier of data requested to transmit and the encryption key associated therewith to the other communication device, when the processing unit determines that the encryption key is stored in the data storage unit in association with the identifier of data requested to transmit.

The processing unit described above may be configured to (b1) when an encryption key is not stored in the data storage unit in association with an identifier of data requested to transmit, generate the encryption key of data requested to transmit, and store the encryption key in the data storage unit in association with the identifier of data requested to transmit, and (b2) generate encrypted data by encrypting data requested to transmit with an encryption key. In this case, the transmission control unit described above may be configured to (c1) transmit the identifier and the encryption key of data requested to transmit, and the encrypted data. This allows the processing unit to prepare for a next transmission, upon receiving data to be transmitted for the first time.

The processing unit described above may be configured to (b2) when an encryption key is not stored in the data storage unit in association with an identifier of data requested to transmit, generate the encryption key of data requested to transmit, and store the encryption key in the data storage unit in association with the identifier of data requested to transmit. In this case, the transmission control unit described above may be configured to (c2) transmit the identifier and the encryption key of data requested to transmit, and data requested to transmit. In a case where the communication path is concealed, unencrypted data may be transmitted as described above.

A system according to a third aspect of the embodiment includes (A) a first communication device, and (B) a second communication device. The first communication device includes (a1) a first data storage unit configured to store an encryption key in association with an identifier of transmitted data, (a2) a processing unit configured to determine whether the encryption key is stored in the first data storage unit in association with the identifier of data requested to transmit, and (a3) a transmission control unit configured to transmit the identifier of data requested to transmit and the encryption key associated therewith to the second communication device, when the processing unit determines that the encryption key is stored in the first data storage unit in association with the identifier of data requested to transmit. The second communication device includes (b1) a second data storage unit configured to store encrypted data in association with the identifier, (b2) a determination unit configured to determine whether encrypted data is stored in the second data storage unit, in association with an identifier contained in data received from the second communication device, (b3) a decoding processing unit configured to decode, with an encryption key contained in the received data, encrypted data stored in the second data storage unit in association with the identifier, when the determination unit determines that encrypted data is stored in the second data storage unit, in association with the identifier contained in the received data, and (b4) an output unit configured to output data decoded by the decoding processing unit.

Provision of such two communication devices allows communication with enhanced security while reducing duplicated transmission of data A program for causing a computer or processor to execute such processing described above may be created, and the program is stored in a computer readable storage medium or a storage device, for example, a flexible disk, an optical disk such as CD-ROM, an optical magnetic disk, a semiconductor memory (for example, ROM), or a hard disk. Data being processed is temporarily stored in a storage device such as a RAM.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication device, comprising:
a memory; and
a processor coupled to the memory and configured to, upon receiving, from another communication device, a sequence of information sets respectively corresponding to a sequence of data-segments, each information set including at least a pair of a segment identifier identifying a data-segment and an encryption key for decoding an encrypted data-segment that is generated from the data-segment by using the encryption key, determine, for each of the sequence of information sets, whether the encrypted data-segment corresponding to the segment identifier is held in the memory in association with the segment identifier, wherein:

in a first case where a first sequence of information sets respectively corresponding to a first sequence of data-segments destined for a first destination and including a first data-segment is received, the first sequence of information sets including a first information set that corresponds to the first data-segment and includes a triplet of a first segment identifier identifying the first data-segment, a first encryption key, and a first encrypted data-segment generated by encrypting the first data-segment with the first encryption key, while the first encrypted data-segment is not held in the memory in association with the first segment identifier, the processor performs a first reception process including:
  acquiring the first encrypted data-segment from the first sequence of information sets,
  storing the acquired first encrypted data-segment in the memory in association with the first segment identifier without storing the received first encryption key in the memory so as to block the first encryption key from being read by unauthorized access to the memory,
  restoring the first data-segment by decoding the first encrypted data-segment with the first encryption key that is obtained from the first information set included in the received first sequence of information sets, and
  outputting the restored first data-segment to the first destination as the first data-segment of the first sequence of data-segments; and in a second case where a second sequence of information sets respectively corresponding to a second sequence of data-segments destined for a second destination and including a second data-segment identical to the first data-segment is received, the second sequence of information sets including a second information set that corresponds to the second data-segment identical to the first data-segment and includes a pair of the first segment identifier and the first encryption key without including the first encrypted data-segment therein, while the first encrypted data-segment is held in the memory in association with the first segment identifier, the processor performs a second reception process including:
  acquiring, from the memory, the first encrypted data-segment associated with the first segment identifier,
  restoring the first data-segment by decoding the first encrypted data-segment with the first encryption key that is obtained from the second information set included in the received second sequence of information sets, and
  outputting the restored first data-segment to the second destination as the second data-segment of the second sequence of the data-segments so as to avoid redundant transmission of the second data-segment for the second destination, which is identical to the first data-segment for the first destination, between the communication device and the another communication device.

2. A communication device, comprising:
a memory; and
a processor coupled to the memory, the processor being configured to, upon transmission of a sequence of data-segments to another communication device, generate a sequence of information sets respectively corresponding to the sequence of data-segments by determining, for each of the sequence of data-segments, whether each data-segment is to be transmitted to the another communication device, depending on whether a segment identifier identifying the each data-segment is held in the memory in association with an encryption key for encrypting the each data-segment, and transmit the generated sequence of information sets each including the encryption key to the another communication device, wherein in a first case where a first sequence of data-segments destined for a first destination and including a first data-segment is to be transmitted to the another communication device while a first segment identifier identifying the first data-segment is not held in the memory in association with a first encryption key for encrypting the first data-segment, the processor performs a first transmission process including:
  generating the first segment identifier and the first encryption key to store the generated first encryption key in the memory in association with the generated first segment identifier,
  generating a first encrypted data-segment by encrypting the first data-segment with the first encryption key,
  building a first information set corresponding to the first data-segment as a triplet of the first segment identifier, the first encryption key, and the first encrypted data-segment,
  generating a first sequence of information sets that respectively correspond to the first sequence of data-segments and include the built first information set, and
  transmitting the first sequence of information sets including the first information set to the another communication device; and in a second case where a second sequence of data-segments destined for a second destination and including a second data-segment identical to the first data-segment is to be transmitted to the another communication device while the first segment identifier identifying the first data-segment is held in the memory in association with the first encryption key for encrypting the first data-segment, the processor performs a second transmission process including:
  building a second information set corresponding to the second data-segment as a pair of the first segment identifier and the first encryption key without including the first encrypted data-segment therein, generating a second sequence of information sets that respectively correspond to the second sequence of data-segments and include the built second information set, and transmitting, to the another communication device, the generated second sequence of information sets not including the first encrypted data-segment to cause the another communication device to restore the second data-segment identical to the first data-segment by decoding the first encrypted data-segment held in the another communication device, so as to avoid redundant transmission of the second data-segment for the second destination, which is identical to the first data-segment for the first destination, between the communication device and the another communication device.

3. A method performed by a communication device including a memory, the method comprising:

upon receiving, from another communication device, a sequence of information sets respectively corresponding to a sequence of data-segments, each information set including at least a pair of a segment identifier identifying a data-segment and an encryption key for decoding an encrypted data-segment that is generated from the data-segment by using the encryption key, determining, for each of the sequence of information sets, whether the encrypted data-segment corresponding to the segment identifier is held in the memory in association with the segment identifier, wherein the method further comprises:

in a first case where a first sequence of information sets respectively corresponding to a first sequence of data-segments destined for a first destination and including a first data-segment is received, the first sequence of information sets including a first information set that corresponds to the first data-segment and includes a triplet of a first segment identifier identifying the first data-segment, a first encryption key, and a first encrypted data-segment generated by encrypting the first data-segment with the first encryption key, while the first encrypted data-segment is not held in the memory in association with the first segment identifier, performing a first reception process including:

acquiring the first encrypted data-segment from the received first sequence of information sets, storing the acquired first encrypted data-segment in the memory in association with the first segment identifier without storing the received first encryption key in the memory so as to block the first encryption key from being read by unauthorized access to the memory, restoring the first data-segment by decoding the first encrypted data-segment with the first encryption key obtained from the first information set included in the received first sequence of information sets, and outputting the restored first data-segment to the first destination as the first data-segment of the second sequence of data-segments; and in a second case where a second sequence of information sets respectively corresponding to a second sequence of data-segments destined for a second destination and including a second data-segment identical to the first data-segment is received, the second sequence of information sets including a second information set that corresponds to the second data-segment identical to the first data-segment and includes a pair of the first segment identifier and the first encryption key without including the first encrypted data-segment therein, while the first encrypted data-segment is held in the memory in association with the first segment identifier, performing a second reception process including:

acquiring, from the memory, the first encrypted data-segment associated with the first segment identifier, restoring the first data-segment by decoding the first encrypted data-segment with the first encryption key that is obtained from the second information set included in the received second sequence of information sets, and outputting the restored first data-segment to the second destination as the second data-segment of the second sequence of data-segments, so as to avoid redundant transmission of the second data-segment for the second destination, which is identical to the first data-segment for the first destination, between the communication device and the another communication device.

4. A method performed by a communication device including a memory, the method comprising;

upon transmission of a sequence of data-segments to another communication device, generating a sequence of information sets respectively corresponding to the sequence of data-segments by determining, for each of the sequence of data-segments, whether each data-segment is to be transmitted to the another communication device, depending on whether a segment identifier identifying the each data-segment is held in the memory in association with an encryption key for encrypting the each data-segment, and transmitting the generated sequence of information sets each including the encryption key to the another communication device, wherein the method further comprises:

in a first case where a first sequence of data-segments destined for a first destination and including a first data-segment is to be transmitted to the another communication device while a first segment identifier identifying the first data-segment is not held in the memory in association with a first encryption key for encrypting the first data-segment, performing a first transmission process including:

generating the first segment identifier and the first encryption key to store the generated first encryption key in the memory in association with the generated first segment identifier, generating a first encrypted data-segment by encrypting the first data-segment with the first encryption key, building a first information set corresponding to the first data-segment as a triplet of the first segment identifier, the first encryption key, and the first encrypted data-segment, generating a first sequence of information sets that respectively correspond to the first sequence of data-segments and include the built first information set, and transmitting the first sequence of information sets including the first information set, to the another communication device; and in a second case where a second sequence of data-segments destined for a second destination and including a second data-segment identical to the first data-segment is to be transmitted to the another communication device while the first segment identifier is held in the memory in association with the first encryption key, performing a second transmission process including:

building a second information set corresponding to the second data-segment as a pair of the first segment identifier and the first encryption key without including the first encrypted data-segment therein, generating a second sequence of information sets that corresponds to the second sequence of data-segments and includes the built second information set, and transmitting, to the another communication device, the second sequence of information sets not including the first encrypted data-segment to cause the another communication device to restore the second data-segment identical to the first data-segment by decoding the first encrypted data-segment held in the another communication device, so as to avoid redundant transmission of the second data-segment for the second destination, which is identical to the first data-segment for the first destination, between the communication device and the another communication device.

5. A system comprising:

a first communication device including a first memory and a first processor coupled of the first memory, the first processor being configured to:

upon transmission of a sequence of data-segments to a second communication device, generate a sequence of information sets respectively corresponding to the sequence of data-segments by determining, for each of the sequence of data-segments, whether each data-segment is to be transmitted to the second communication device, depending on whether a segment identifier identifying the each data-segment is held in the first memory in association with an encryption key for encrypting the each data-segment, and transmit the generated sequence of information sets each including the encryption key to the second communication device; and the second communication device including a second memory and a second processor coupled to the second memory, the second processor being configured to:

upon receiving, from the first communication device, the sequence of information sets respectively corresponding to the sequence of data-segments, each information set including at least a pair of the segment identifier and the encryption key corresponding to each data-segment, determine, for each of the sequence of information sets, whether an encrypted data-segment generated by encrypting the each data-segment identified by the segment identifier is held in the second memory in association with the segment identifier, wherein:

in a first case where a first sequence of data-segments destined for a first destination and including a first data-segment is to be transmitted from the first communication device to the second communication device while a first encryption key for encrypting the first data-segment is not held in the first memory in association with a first identifier identifying the first data-segment:

the first processor of the first communication device performs a first transmission process including:
generating the first segment identifier identifying the first data-segment and the first encryption key for encrypting the first data-segment to store the generated first encryption key in the first memory in association with the generated first segment identifier, generating a first encrypted data-segment by encrypting the first data-segment with the first encryption key, building a first information set corresponding to the first data-segment as a triplet of the first segment identifier, the first encryption key, and the first encrypted data-segment, generating a first sequence of information sets that respectively correspond to the first sequence of data-segments and include the built first information set, and transmitting the first sequence of information sets including the first information set to the second communication device; and the second processor of the second communication device performs a first reception process upon receiving, from the first communication device, the first sequence of information sets including the first information set, the first reception process including:

acquiring the first encrypted data-segment from the first sequence of information sets, storing the acquired first encrypted data-segment in the second memory in association with the first segment identifier without storing the received first encryption key in the second memory, so as to block the first encryption key from being read by unauthorized access to the second memory, restoring the first data-segment by decoding the first encrypted data-segment with the first encryption key that is obtained from the received first sequence of information sets, and outputting the restored first data-segment to the first destination as the first data-segment of the first sequence of data-segments; and in a second case where a second sequence of data-segments destined for a second destination and including a second data-segment identical to the first data-segment is to be transmitted from the first communication device to the second communication device while the first encryption key is held in the first memory in association with the first segment identifier identifying the first data-segment:

the first processor of the first communication device performs a second transmission process including:

building a second information set corresponding to the second data-segment as a pair of the first segment identifier and the first encryption key without including the first encrypted data-segment therein, generating a second sequence of information sets that respectively correspond to the second sequence of data-segments and include the second information set, and transmitting, to the second communication device, the second sequence of information sets not including the first encrypted data-segment to cause the second processor of the second communication device to restore the second data-segment identical to the first data-segment by decoding the first encrypted data-segment held in the second memory, so as to avoid redundant transmission of the second data-segment for the second destination, which is identical to the first data-segment for the first destination, between the first communication device and the second communication device; and the second processor of the second communication device performs a second reception process upon receiving, from the first communication device, the second sequence of information sets including the second information set, the second reception process including:
acquiring, from the second memory, the first encrypted data-segment associated with the first segment identifier,
restoring the first data-segment by decoding the acquired first encrypted data-segment with the first encryption key that is obtained from the second information set included in the received second sequence of information sets, and
outputting the restored first data-segment to the second destination as the second data-segment of the second sequence of data-segments.

6. A non-transitory, computer-readable recording medium having stored therein a program for causing a computer included in a communication device to execute a process comprising:
upon receiving, from another communication device, a sequence of information sets respectively corresponding to a sequence of data-segments, each information set including at least a pair of a segment identifier identifying a data-segment and an encryption key for decoding an encrypted data-segment that is generated from the data-segment by using the encryption key, determining, for each of the sequence of information sets, whether the encrypted data-segment corresponding to the segment identifier is held in the memory in association with the segment identifier,
wherein the process further comprises:
in a first case where a first sequence of information sets respectively corresponding to the sequence of data-segments destined for a first destination and including a first data-segment is received, the first sequence of information sets including a first information set that corresponds to the first data-segment and includes a triplet of a first segment identifier identifying the first data-segment, a first encryption key, and a first encrypted data-segment generated by encrypting the first data-segment with the first encryption key, while the first encrypted data-segment is not held in the memory in association with the first segment identifier, performing a first reception process including:
acquiring the first encrypted data-segment from the received first sequence of information sets,
storing the acquired first encrypted data-segment in the memory in association with the first segment identifier without storing the received first encryption key in the memory so as to block the first encryption key from being read by unauthorized access to the memory,
restoring the first data-segment by decoding the first encrypted data-segment with the first encryption key obtained from the first information set included in the received first sequence of information sets, and
outputting the restored first data-segment to the first destination as the first data-segment of the first sequence of data-segments; and
in a second case where a second sequence of information sets respectively corresponding to a second sequence of data-segments destined for a second destination and including a second data-segment identical to the first data-segment is received, the second sequence of information sets including a second information set that corresponds to the second data-segment identical to the first data-segment and includes a pair of the first segment identifier and the first encryption key without including the first encrypted data-segment therein, while the first encrypted data-segment is held in the memory in association with the first segment identifier, performing a second reception process including:
acquiring, from the memory, the first encrypted data-segment associated with the first segment identifier,
restoring the first data-segment by decoding the first encrypted data-segment with the first encryption key that is obtained from the second information set included in the received second sequence of information sets, and
outputting the restored first data-segment to the second destination as the second data-segment of the second sequence of data-segments, so as to avoid redundant transmission of the second data-segment for the second destination, which is identical to the first data-segment for the first destination, between the communication device and the another communication device.

7. A non-transitory, computer-readable recording medium stored therein a program for causing a computer included in a communication device to execute a process comprising:
upon transmission of a sequence of data-segments to another communication device, generating a sequence of information sets respectively corresponding to the sequence of data-segments by determining, for each of the sequence of data-segments, whether each data-segment is to be transmitted to the another communication device, depending on whether a segment identifier identifying the each data-segment is held in the memory in association with an encryption key for encrypting the each data-segment, and transmitting the generated sequence of information sets each including the encryption key to the another communication device, wherein the process further comprises:
in a first case where a first sequence of data-segments destined for a first destination and including a first data-segment is to be transmitted to the another communication device while a first segment identifier identifying the first data-segment is not held in the memory in association with a first encryption key for encrypting the first data-segment, performing a first transmission process including:
generating the first segment identifier and the first encryption key to store the generated first encryption key in the memory in association with the generated first segment identifier,
generating a first encrypted data-segment by encrypting the first data-segment with the first encryption key,
building a first information set corresponding to the first data-segment as a triplet of the first segment identifier, the first encryption key, and the first encrypted data-segment,
generating a first sequence of information sets that respectively correspond to the first sequence of data-segments and include the built first information set, and
transmitting the first sequence of information sets including the first information set to the another communication device; and
in a second case where a second sequence of data-segments destined for a second destination and including a second data-segment identical to the first data-segment is to be transmitted to the another communication device while the first segment identifier is held in the memory in association with the first encryption key, performing a second transmission process including:

building a second information set corresponding to the second data-segment as a pair of the first segment identifier and the first encryption key without including the first encrypted data-segment therein, so as to reduce an amount of data included in the second information set, generating a second sequence of information sets that respectively correspond to the sequence of information sets and include the built second information set, and transmitting, to the another communication device, the second sequence of information sets not including the first encrypted data-segment to cause the another communication device to restore the second data-segment identical to the first data-segment by decoding the first encrypted data-segment held in the another communication device, so as to avoid redundant transmission of the second data-segment for the second destination, which is identical to the first data-segment for the first destination, between the communication device and the another communication device.

8. The communication device according to claim 1, wherein the segment identifier is a hash of the data-segment.

* * * * *